(12) United States Patent
Liu et al.

(10) Patent No.: US 11,910,319 B2
(45) Date of Patent: Feb. 20, 2024

(54) CONFIGURATION FOR UNGROUPED WAKE UP SIGNAL AND GROUP WAKE UP SIGNAL

(71) Applicant: QUALCOMM Incorporated, San Diego, CA (US)

(72) Inventors: Le Liu, San Jose, CA (US); Alberto Rico Alvarino, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/646,639

(22) Filed: Dec. 30, 2021

(65) Prior Publication Data

US 2022/0124621 A1    Apr. 21, 2022

Related U.S. Application Data

(62) Division of application No. 17/039,123, filed on Sep. 30, 2020, now Pat. No. 11,558,817.

(Continued)

(51) Int. Cl.
*H04W 52/02* (2009.01)
*H04L 5/00* (2006.01)

(52) U.S. Cl.
CPC ......... *H04W 52/0229* (2013.01); *H04L 5/005* (2013.01); *H04L 5/0007* (2013.01); *H04W 52/0216* (2013.01); *H04W 52/0219* (2013.01)

(58) Field of Classification Search
CPC ......... H04W 52/0229; H04W 52/0216; H04W 52/0219; H04W 68/02; H04W 72/0446;
(Continued)

(56) References Cited

U.S. PATENT DOCUMENTS

2018/0255515 A1* 9/2018 Gupta Hyde ..... H04W 52/0235
2019/0090191 A1   3/2019 Liu et al.
(Continued)

FOREIGN PATENT DOCUMENTS

CN    109429315 A    3/2019
CN    109586840 A    4/2019
(Continued)

OTHER PUBLICATIONS

HUAWEI: "Consideration on UE Group Wake Up Signal (WUS)", 3GPP Draft, 3GPP TSG-RAN WG3 Meeting #105, R3-193418, NB-IOT WUS, 3rd Generation Partnership Project (3GPP), Mobile Competence Centre, 650, Route Des Lucioles, F-06921 Sophia-Antipolis Cedex, France, vol. RAN WG3, No. Ljubljana, Slovenia, Aug. 26, 2019-Aug. 30, 2019, Aug. 16, 2019 (Aug. 16, 2019), XP051769636, 5 Pages, Retrieved from the Internet: URL: http://www.3gpp.org/ftp/tsg_ran/WG3_lu/TSGR3_105/Docs/R3-193418.zip, [retrieved on Aug. 16, 2019] paragraph 2 paragraph 5 figures 1 and 2.

(Continued)

*Primary Examiner* — Ian N Moore
*Assistant Examiner* — Latresa A Mccallum
(74) *Attorney, Agent, or Firm* — ArentFox Schiff LLP; Nerrie M. Zohn

(57) ABSTRACT

The present disclosure relates to transmitting and receiving a group wake-up signal (WUS) in conjunction with an ungrouped WUS. A base station may group one or more UEs in a UE group, while other UEs may not be assigned to a UE group. The configuration of WUS resources and WUS sequences for grouped UEs and other UEs is a challenge. The base station may transmit, to one or more UEs in the UE group, a resource allocation of a group WUS resource within a set of WUS resources associated with a paging occasion that is assigned to the one or more UEs in the UE group. A
(Continued)

UE, after receiving the resource allocation, may determine a location of the group WUS resource within the set of WUS resources. The UE may monitor for a group WUS at the determined location in the resource allocation of the group WUS resource.

27 Claims, 23 Drawing Sheets

Related U.S. Application Data

(60) Provisional application No. 62/931,770, filed on Nov. 6, 2019, provisional application No. 62/911,163, filed on Oct. 4, 2019.

(58) Field of Classification Search
CPC .............. H04W 72/0453; H04W 76/28; H04L 5/0007; H04L 5/005; H04L 5/0037; Y02D 30/70
See application file for complete search history.

(56) References Cited

U.S. PATENT DOCUMENTS

| | | | |
|---|---|---|---|
| 2019/0103950 A1* | 4/2019 | Liu | H04W 4/06 |
| 2019/0159128 A1* | 5/2019 | Lin | H04W 68/00 |
| 2019/0273647 A1* | 9/2019 | Shellhammer | H04L 27/2331 |
| 2020/0029302 A1* | 1/2020 | Cox | H04W 68/02 |
| 2020/0037396 A1* | 1/2020 | Islam | H04W 24/08 |
| 2020/0107267 A1 | 4/2020 | Wu et al. | |
| 2020/0275375 A1 | 8/2020 | Liu et al. | |
| 2020/0280959 A1 | 9/2020 | Sharma et al. | |
| 2020/0359322 A1 | 11/2020 | Hwang et al. | |
| 2021/0044394 A1 | 2/2021 | Beale et al. | |
| 2021/0051583 A1* | 2/2021 | Shikari | H04W 4/06 |
| 2021/0105718 A1 | 4/2021 | Liu et al. | |
| 2021/0306951 A1 | 9/2021 | Hwang et al. | |
| 2021/0329558 A1 | 10/2021 | Yang et al. | |
| 2021/0360582 A1* | 11/2021 | Priyanto | H04W 4/70 |
| 2022/0124620 A1 | 4/2022 | Liu et al. | |

FOREIGN PATENT DOCUMENTS

| | | | |
|---|---|---|---|
| WO | 2019086674 A1 | 5/2019 | |
| WO | 2019147061 A1 | 8/2019 | |

OTHER PUBLICATIONS

International Search Report and Written Opinion—PCT/US2020/053811—ISA/EPO—dated Mar. 16, 2021.
Partial International Search Report—PCT/US2020/053811—ISA/EPO—dated Jan. 19, 2021.
QUALCOMM Incorporated: "UE-Group Wake-Up Signal for MTC", 3GPP Draft, 3GPP TSG-RAN WG1 #98, R1-1908825_MWUS UE Grouping V1, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765433, 11 Pages, URL: http://www.3gpp.org/ftp/tsg_ran/WG1_RL1/TSGR1_98/Docs/R1-1908825.zip. [retrieved on Aug. 17, 2019] paragraph 2 paragraph 4 figures 1 and 4.
ZTE Corporation: "Consideration on UE-Group Wake-Up Signal for NB-IOT and eMTC", 3GPP Draft, 3GPP TSG-RAN WG2 Meeting#103bis, R2-1814382, Consideration on UE-Group Wake-up Signal for NB-IOT and eMTC, 3rd Generation Partnership Project (3GPP), Mobile Competence Centre, 650, Route Des Lucioles, F-06921 Sophia-Antipolis Cedex, France, vol. RAN WG2, No. Chengdu, China; Oct. 8, 2018-Oct. 12, 2018, Sep. 28, 2018 (Sep. 28, 2018), XP051523817, 5 pages, Retrieved from the Internet: URL: http://www.3gpp.org/ftp/tsg%5Fran/WG2%5FRL2/TSGR2%5F103bis/Docs/R2%2D1814382%2Ezip. [retrieved on Sep. 28, 2018] sections 2.1-2.2, paragraph 2.1, paragraph 2.2, figure 1.
Anonymous: "3 Generation Partnership Project, Technical Specification Group Radio Access Network, Evolved Universal Terrestrial Radio Access (E-UTRA), User Equipment (UE) Procedures in Idle Mode (Release 15)", 3GPP Standard, Technical Specification, 3GPP TS 36.304, 3rd Generation Partnership Project, Mobile Competence Centre, 650, Route Des Lucioles, F-06921 Sophia-Antipolis Cedex, France, vol. RAN WG2, No. V15.4.0, Jun. 25, 2019, XP051754352, pp. 1-55, paragraph 7.3, paragraph 7.4.
European Search Report—EP23161117—Search Authority—Munich dated Jun. 20, 2023.
European Search Report—EP23161120—Search Authority—Munich—dated Jun. 20, 2023.
Huawei et al., "On Configurations and Procedures of Power Saving Signal", 3GPP TSG RAN WG1 Meeting #91, R1-1719471, 3rd Generation Partnership Project, Mobile Competence Centre, 650, Route Des Lucioles, F-06921 Sophia-Antipolis Cedex, France, vol. RAN WG1, No. Reno, USA, Nov, 27, 2017-Dec. 1, 2017 Nov. 17, 2017, XP051369169, 6 Pages, paragraph 3, figure 4.
LG Electronics: "Discussion on UE-Grouping Wake Up Signal in Nb-IoT", 3GPP TSG RAN WG1 #96, R1-1902063, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 16, 2019, XP051599759, 7 Pages, paragraph 2, figure 1.
Mediatek Inc: "UE-Group WUS in NB-IoT", R1-1808959-Mediatek-R1-94, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018 Aug. 10, 2018, XP051516332, 5 Pages, paragraphs 1 to 3.
NTT DOCOMO et al., "UE-Group Wake-Up Signal for Rel.16 IoT", 3GPP TSG RAN WG1 Meeting #94bis, R1-1811385, 3rd Generation Partnership Project, Mobile Competence Centre, 650, Route Des Lucioles, F-06921 Sophia-Antipolis Cedex, France, vol. Ran WG1, No. Chengdu, China, Oct. 8, 2018-Oct. 12, 2018 Sep. 29, 2018, XP051518789, 4 Pages, paragraph 2, figure 3.
Qualcomm Incorporated: "Feature Lead Summary of 6.2.1.1 UE Group MWUS", 3GPP TSG-RAN WG1 #98, R1-1909394, Prague, CZ, Aug. 26-30, 2019, 13 Pages, Sep. 3, 2019.
Qualcomm Incorporated: "UE-Group Wake-Up Signal for NB-IoT", R1-1908834_NWUS UE GROUPING_V1, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019 Aug. 17, 2019, XP051765442, paragraph 2, paragraph 3, figure 1.

* cited by examiner

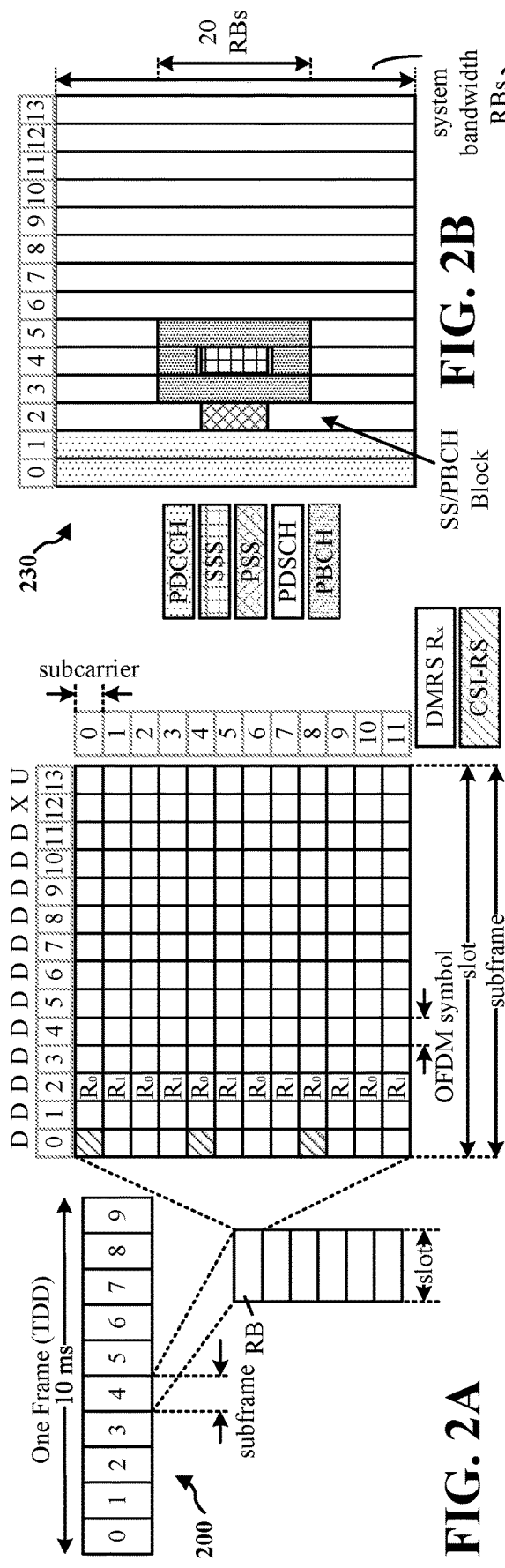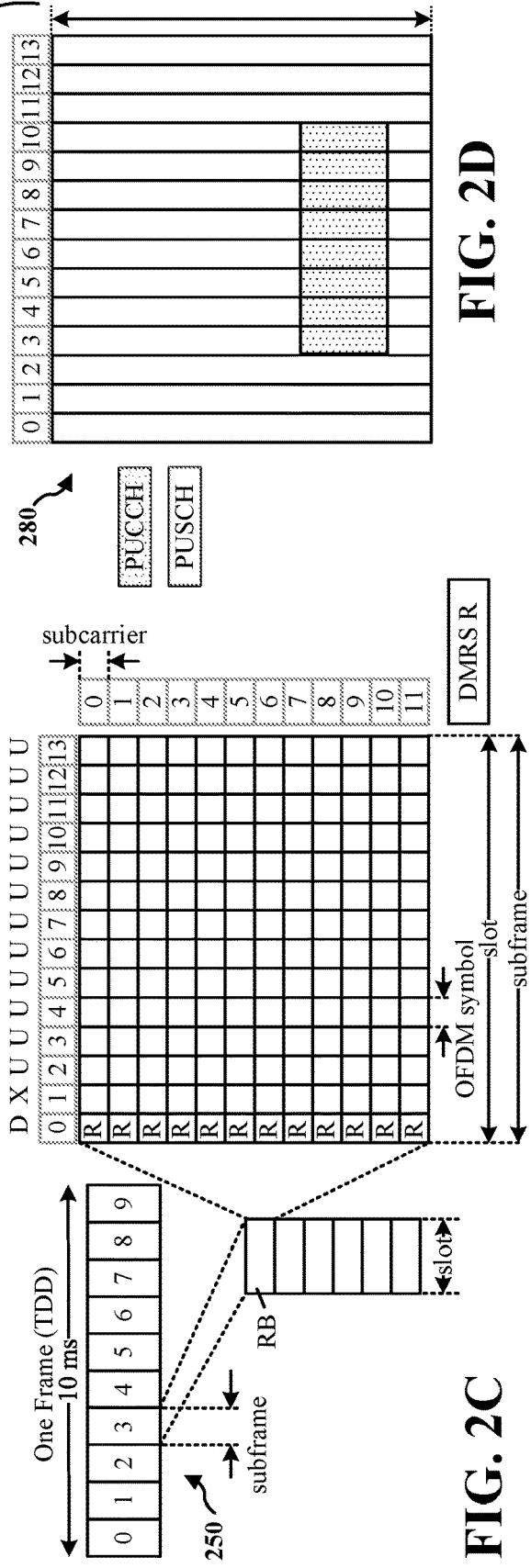

2300

$m = (PO_{Index} + m_0 + \text{offset}) \bmod M$

NB-IoT, M=2

| #1 | #0 |
|---|---|

MTC, M=2, 3, or 4

| #0 |
|---|
| #1 |

M=2

| #2 | #0 |
|---|---|
|    | #1 |

M=3

| #2 | #0 |
|---|---|
| #3 | #1 |

M=4

2310

$m = 1 + (PO_{Index} + (m_0 - 1) + \text{offset}) \bmod M$

MTC, M=2, 3, or 4

| #2 | x |
|---|---|
|    | #1 |

M=2

| #2 | x |
|---|---|
| #3 | #1 |

CONFIGURATION FOR UNGROUPED WAKE UP SIGNAL AND GROUP WAKE UP SIGNAL

CROSS REFERENCE TO RELATED APPLICATION(S)

This application is a divisional application of U.S. Nonprovisional application Ser. No. 17/039,123, entitled "CONFIGURATION FOR UNGROUPED WAKE UP SIGNAL AND GROUP WAKE UP SIGNAL" and filed on Sep. 30, 2020, which claims the benefit of U.S. Provisional Application Ser. No. 62/911,163, entitled "CONFIGURATION FOR UNGROUPED WAKE UP SIGNAL AND GROUPED WAKE UP SIGNAL" and filed on Oct. 4, 2019, and U.S. Provisional Application Ser. No. 62/931,770, entitled "CONFIGURATION FOR UNGROUPED WAKE UP SIGNAL AND GROUPED WAKE UP SIGNAL" and filed on Nov. 6, 2019, all of which are expressly incorporated by reference herein in their entirety.

BACKGROUND

Technical Field

The present disclosure relates generally to communication systems, and more particularly, to a configuration for grouped and ungrouped wake up signals.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE may be configured for discontinuous reception (DRX). The UE may monitor for a page from the base station in order to determine whether to wake up to receiving communication from the base station. In some instances, a wake-up signal (WUS) can be sent from a base station to a UE in order to provide notification of an upcoming paging occasion (PO). When sending and receiving multiple WUSs and POs, it can be beneficial to determine a strategy and/or conserve the amount of WUSs and POs that are sent throughout the wireless system. By doing so, the overall power consumption of the wireless system can be improved.

UEs may be configured to support a group WUS where a base station can group a plurality of UEs into one or more UE groups and transmit a group WUS to a particular group of UEs. The base station may be able to assign a UE group identification or a group WUS sequence to the UE group. Grouping the UEs allows the base station to transmit a WUS to a specific set of UEs rather than transmitting the WUS to all UEs being served by the base station. Grouping the UEs allows the base station to determine and transmit a WUS identifying which UEs within the UE group should wake-up for a paging occasion (PO). Prior to receiving the transmission, the UEs can listen for the WUS. After receiving the WUS, the identified UEs can wake-up before receiving the corresponding PO. Each WUS may have a duration, which may be limited by a maximum allowed WUS duration. Additionally, a gap period may be provided between the end of the WUS and the PO.

The base station can also determine the total number of different UE groups, wherein each UE is assigned to a particular group. Within each group, some UEs may be capable of being assigned to a UE group, while other UEs may not be capable of being assigned to a UE group. In some aspects, each legacy or ungrouped UE can receive the same WUS, e.g., a legacy WUS, and each grouped UE can receive a WUS that targets the particular group or sub-group for that UE, e.g., a group-specific WUS. The legacy WUS can identify which legacy or ungrouped UEs should wake-up for an ungrouped PO. Likewise, the group-specific WUS can identify which grouped UE should wake-up for a group-specific PO.

In an aspect of the disclosure, a method, a computer-readable medium, and an apparatus are provided for wireless communication at a UE for monitoring for a group WUS. The apparatus receives, from a base station, a resource allocation of a group wake-up signal (WUS) resource assigned to one or more UEs in a UE group. The apparatus determines a location of the group WUS resource within a set of WUS resources associated with a paging occasion. The apparatus monitors for a group WUS at the determined location in the resource allocation of the group WUS resource.

In another aspect of the disclosure, a method, computer-readable medium, and an apparatus are provided for wireless communication at a UE for monitoring for a group WUS while in extended discontinuous reception (eDRX) mode. The apparatus receives, from a base station, an eDRX configuration configuring the UE for eDRX mode. The apparatus determines a number of consecutive POs associated with a group WUS. The apparatus monitors for the group WUS, while in eDRX mode based on the determined number of consecutive POs.

In another aspect of the disclosure, a method, computer-readable medium, and an apparatus are provided for wireless communication at a UE for monitoring for a WUS at a WUS resource. The apparatus receives, from a base station, a resource allocation for a group wake-up signal (WUS) associated with one or more UEs in a UE group, wherein the UE is within the UE group. The apparatus monitors for the WUS at a first WUS resource of M WUS resources for a first PO. The apparatus monitors for the WUS at a second WUS resource of M WUS resources associated with a second PO.

In another aspect of the disclosure, a method, computer-readable medium, and an apparatus are provided for wireless communication at a base station for transmitting a WUS. The apparatus groups one or more UEs in a UE group. The apparatus transmits, to one or more UEs in the UE group, an allocation of resources assigned to the one or more UEs in the UE group, the allocation of resources comprising a group WUS resource within a set of WUS resources associated with a PO.

In another aspect of the disclosure, a method, computer-readable medium, and an apparatus are provided for wireless communication at a base station for transmitting an eDRX configuration to a UE. The apparatus configures an eDRX configuration, the eDRX configuration includes a number of consecutive POs associated with a group WUS. The apparatus transmits, to at least one UE, the eDRX configuration to configure the at least one UE for eDRX mode.

In another aspect of the disclosure, a method, computer-readable medium, and an apparatus are provided for wireless communication at a base station for transmitting a group WUS to one or more UEs in a UE group. The apparatus configures an allocation of resources for a group WUS associated with one or more UEs in a UE group, wherein a first WUS resource of M WUS resources is associated with a first PO and a second WUS resource of M WUS resources is associated with a second PO. The apparatus transmits the group WUS to the one or more UEs in the UE group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 23 illustrates examples of enabling of UE group alternating among WUS resources.

DETAILED DESCRIPTION

Figure 1:
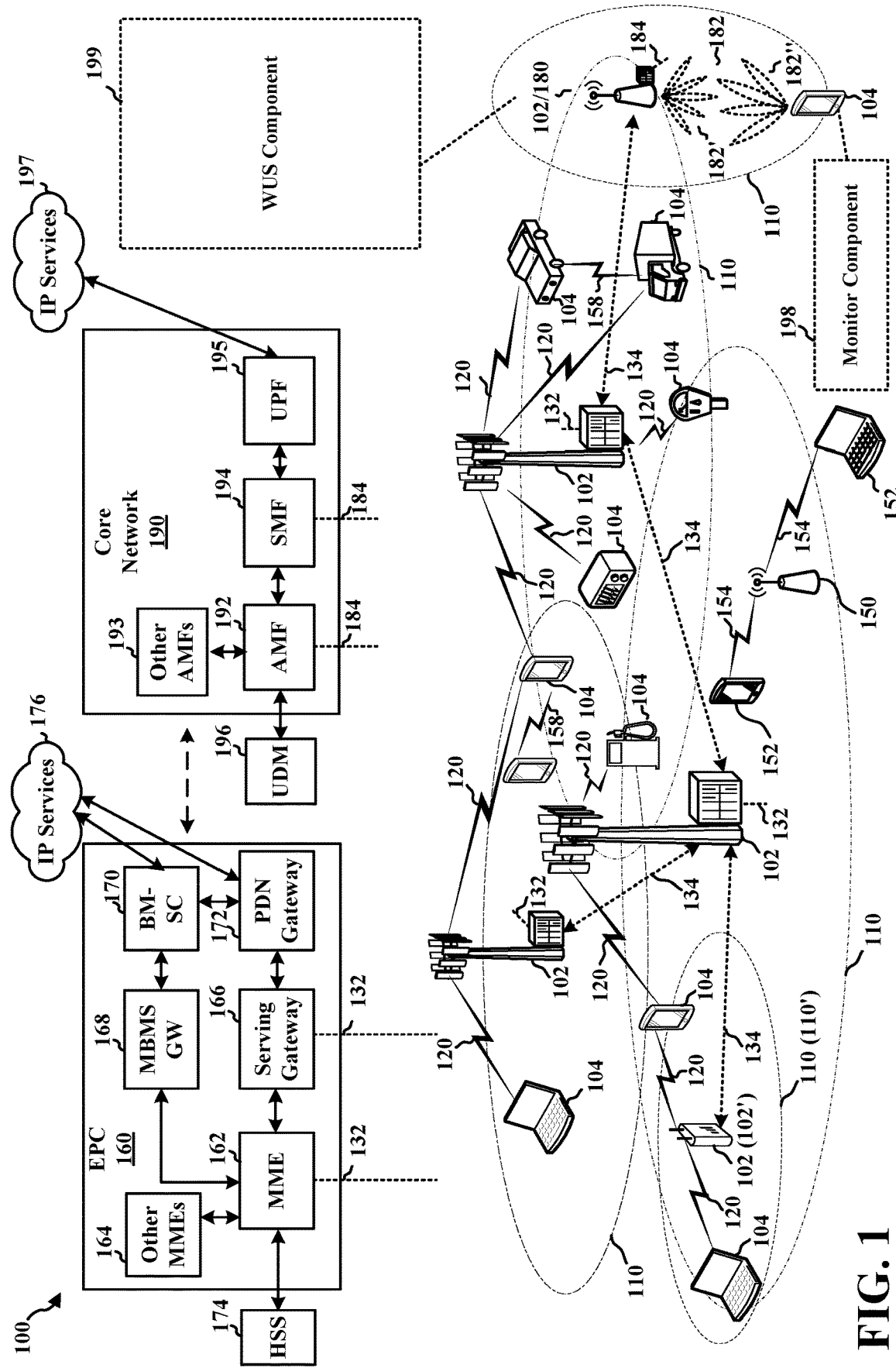
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to monitor for a group WUS at a determined location. For example, the UE 104 of FIG. 1 may include a monitor component 198 configured to monitor for a group WUS at a determined location in an allocation of resources. The UE 104 may receive, from a base station, the allocation of resources assigned to one or more UEs in a UE group, the allocation of resources comprising a group WUS resource. The UE 104 may determine a location of the group WUS resource within a set of WUS resources associated with a paging occasion.

Referring again to FIG. 1, in certain aspects, the base station 102/180 may be configured to transmit a group WUS resource. For example, the base station 102/180 of FIG. 1 may include a WUS component 199 configured to transmit, to one or more UEs in a UE group, an allocation of resources assigned to the one or more UEs in the UE group, the allocation of resources comprising a group WUS resource within a set of WUS resources associated with a paging occasion. The base station 102/180 may group one or more UEs in the UE group.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
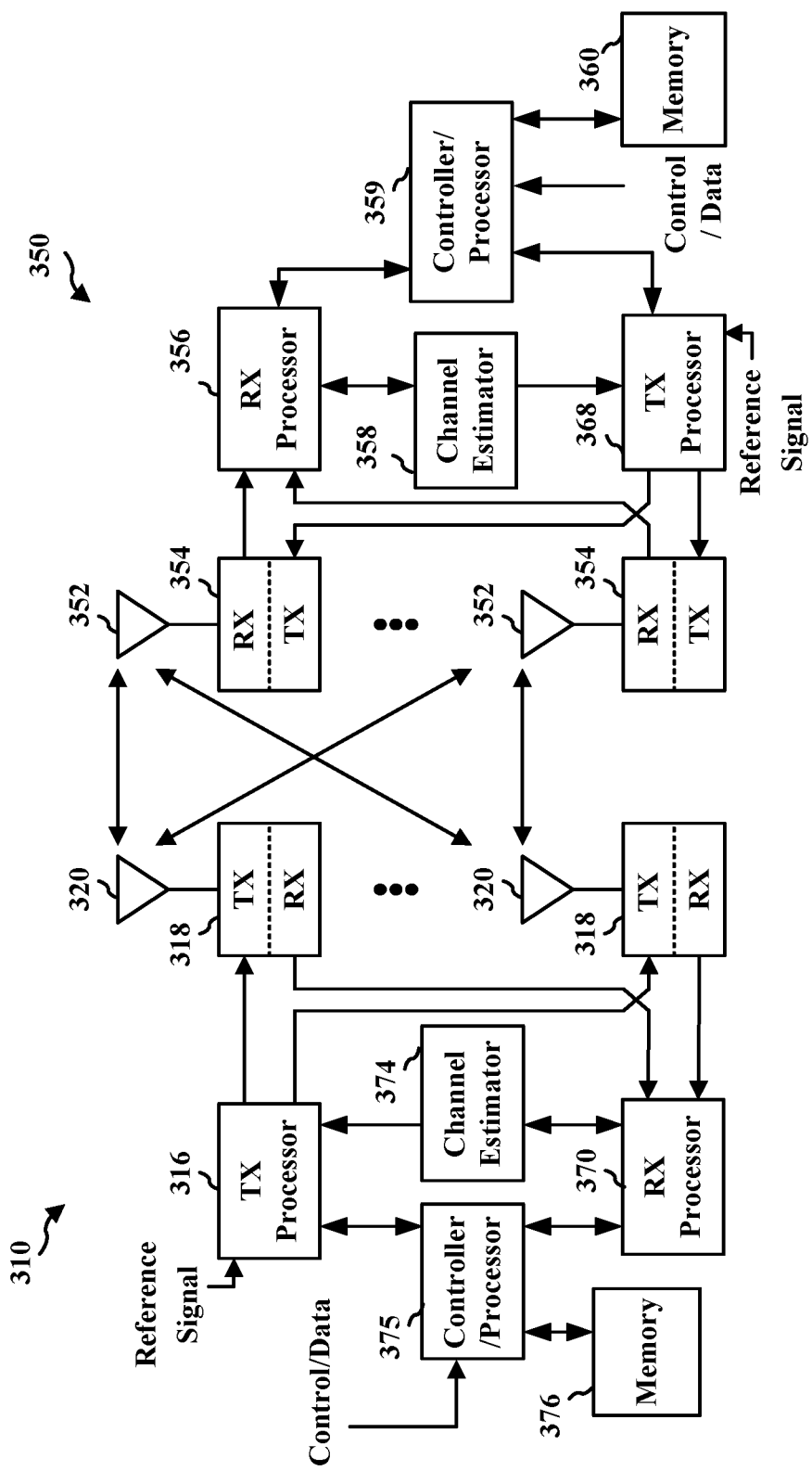
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A UE may be configured for discontinuous reception (DRX). The UE may monitor for a page from the base station in order to determine whether to wake up to receiving communication from the base station. In some instances, a wake-up signal (WUS) can be sent from a base station to a UE in order to provide notification of an upcoming paging occasion (PO). When sending and receiving multiple WUSs and POs, it can be beneficial to determine a strategy and/or conserve the amount of WUSs and POs that are sent throughout the wireless system. By doing so, the overall power consumption of the wireless system can be improved.

UEs may be configured for a group WUS. A base station can group a plurality of UEs into one or more UE groups and may transmit a group WUS to a particular group of UEs. The base station may be able to assign a UE group identification or a group WUS sequence to the UE group. Grouping the UEs allows the base station to transmit a WUS to a specific set of UEs within a particular UE group, instead of transmitting the WUS to all UEs served by the base station. Grouping the UEs allows the base station to determine and transmit a WUS identifying which UEs within the UE group should wake-up for a paging occasion (PO). Prior to receiving the transmission, the UEs can listen for the WUS. After receiving the WUS, the identified UEs can wake-up before receiving the corresponding PO. Each WUS may have a duration that is limited to avoid exceeding a maximum allowed WUS duration. Additionally, a gap period may be provided between the end of the WUS and the PO.

The base station can also determine the total number of different UE groups, wherein each UE is assigned to a particular group. Within each group, there can be group-capable or grouped UEs and/or ungrouped UEs. The ungrouped UEs may be UEs that do not support a group WUS or is not assigned to a group WUS. An ungrouped WUS may be referred to as a legacy WUS. The grouped UEs may be UE that are capable of being assigned to a UE group, while the legacy or ungrouped UEs may not be capable of being assigned to a UE group. In some aspects, each ungrouped UE can receive the same WUS, e.g., an ungrouped WUS, and each grouped UE can receive a group WUS that targets the particular group or sub-group for that UE, e.g., a group-specific WUS. The ungrouped WUS can identify which ungrouped UEs should wake-up for an ungrouped PO. Likewise, the group WUS can identify which grouped UEs should wake-up for a group-specific PO.

According to a first implementation, up to two time-multiplexed WUS resources, for both the ungrouped WUS and the group WUS, may be configured. The first implementation may be applied for communication based on NB-IoT as well as other types of wireless communication. The location of a group WUS may be determined in relation to the ungrouped WUS. In instances where one group WUS resource is configured, the group WUS resource may be configured to coincide with the ungrouped WUS resource or to occur immediately before the ungrouped WUS resource. In instances where two group WUS resources are configured, the first group WUS resource may coincide with the ungrouped WUS resource and the second group WUS resource may occur immediately before the first group WUS resource.

According to a second implementation, the ungrouped WUS and group WUS may be configured simultaneously to have up to 4 orthogonal WUS resources including the ungrouped WUS resources. The second implementation may be employed, for example, for machine type communication (MTC) as well as other types of wireless communication. Up to 2 orthogonal resources including the ungrouped WUS resource may be configured in the time domain, while up to 2 orthogonal resources may be configured in the frequency domain. In some instances, the two orthogonal resources do not necessarily include the ungrouped WUS resource.

An ungrouped WUS and a group WUS may be configured on the same ungrouped WUS resource based on system information. If a group WUS is configured to share WUS resources with a non-group WUS, a common WUS that is common for all of the groups of UEs may be configured to be a non-group WUS or a legacy WUS. The common WUS may also be configured to be a group WUS that is common to all UE groups, and therefore may not be considered a legacy WUS. The group WUS may use the same gap configurations as the ungrouped WUS, with the exception of differences from possible TDM. The use of the same gap period in time may help to avoid additional signaling for a separate gap configuration. A UE may assume that a transmit power for a group WUS and an ungrouped WUS is the same. The base station may set a power offset for both the grouped and ungrouped WUS relative to a reference signal, e.g., WUS energy per resource element (EPRE) relative to cell-specific reference signal (RS) EPRE. Additionally, a maximum WUS duration for the group WUS may be the same as for the ungrouped WUS.

A UE may detect 2 sequences, the common WUS (that is common to all of the UE groups) and the group WUS associated to the group to which the UE belongs. For at least a group WUS in the same WUS resource, an ungrouped WUS with phase shifts "g" may be selected as a group WUS sequence design according to the following:

$$w\_(group)(m')=w(m')\exp(j2\pi gm/G).$$

$$G=132 \text{ and } g=14*(UE\_group\_index+1),$$
$$0 \le UE\_group\_index \le 7$$

The sequence resulting from g=126 may be the common WUS, unless a common WUS is configured to be an ungrouped WUS. Different WUS resources may use different scrambling sequences by using different initialization seeds, e.g., c_init, or by using different truncated part of a long scrambling sequence with same scrambling seed as that of ungrouped WUS.

In some instances, the group WUS may be enabled independently from the ungrouped WUS. For example, the group WUS may be enabled without enabling the ungrouped WUS. Alternatively, the group WUS and the ungrouped WUS may both be enabled. Presented herein are aspects of the disclosure directed to indicating the configuration of the group WUS. As presented herein, the group WUS configuration may be determined using at least some of the parameters of the ungrouped WUS.

Figure 4:
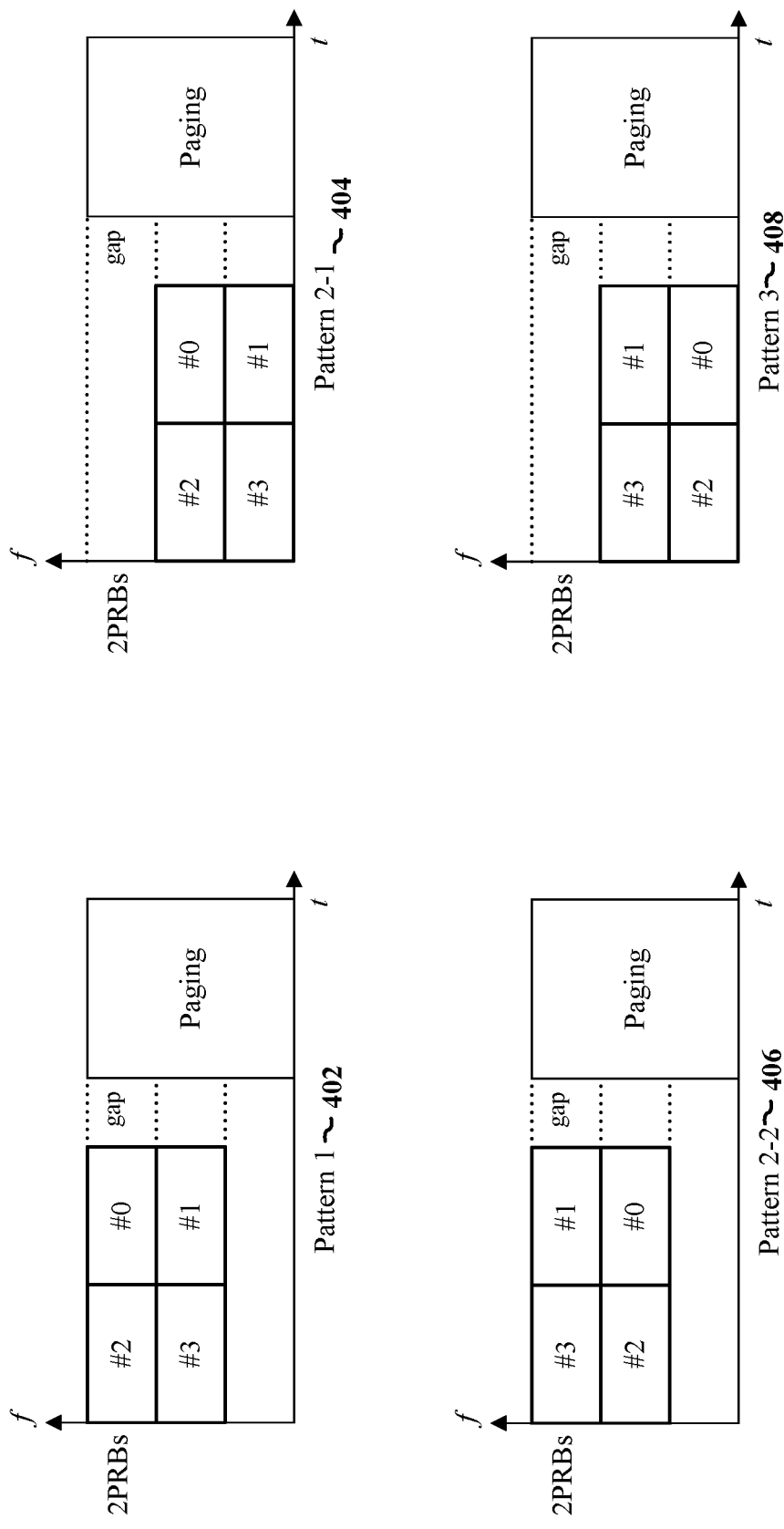
FIG. 4 illustrates examples of patterns of WUS resources.

FIG. 4 illustrates examples 400 of patterns of WUS resources. In some instances, WUS resources that are associated with the same PO and same gap on the same narrow band may be consecutive to each other. This allows for a reduction in peak to average power ration (PAPR) as well as the combinations of the patterns. The WUS resources may include the resources used to transmit ungrouped and group WUS sequences. In instances where the ungrouped WUS is configured, the location of the WUS resource (e.g., #0) for ungrouped WUS sequence (e.g., #0) may be used to indicate the location of other WUS resources used to transmit other group WUS sequences. In some aspects, if the ungrouped WUS resource #0 is located in the top 2-RB (a first resource block and a second resource block) of a six resource block bandwidth, Pattern 1 402 may be used. In some aspects, if the ungrouped WUS resource #0 is located in the center 2-RB (a third resource block and a fourth resource block) of the six resource block bandwidth, a 1-bit indication may be used to indicate the desired pattern, for example Pattern 2-1 404 or Pattern 2-2 406 may be used. In some aspects, one of the Patterns 2-1 or 2-2 may be predefined without additional signaling. In yet some aspects, if the ungrouped WUS resource #0 is located in the bottom 2-RB (a fifth resource block and a sixth resource block) of the six resource block bandwidth, then Pattern 3 408 may be used. The WUS resources #1, #2, and #3 may be configured to transmit group WUS sequences, while the WUS resource #0 may be configured to be shared by the ungrouped WUS sequence and group WUS sequences. In aspects where the ungrouped WUS is not configured, then all the WUS resources are used to transmit group WUS sequences. In some aspects, a 2-bit indication may be used to indicate the WUS resource #0 frequency position, such as the top, center or bottom 2-PRB in the six-RB bandwidth, which also implicitly indicated the Pattern 1, 2-1 or 3 based on the indicated location of WUS resource #0, respectively; while in some aspects, a 2-bit indication may be used to directly indicate Patterns 1, 2-1, 2-2, or 3. Table 1 summarizes the location of WUS resource Pattern 1, 2 (same as Pattern 2-1) or 3, where a 1st time slot for WUS (e.g., corresponding to WUS resource #0 for NB-IoT, WUS resource #0, #1 for MTC) may be the time duration of [w0, g0-1], starting from subframe w0 and ends in subframe g0-1 with w0 as the latest subframe such that there is a total of valid DL subframe for the configured WUS max duration in the maximum duration and g0 as g0=PO−timeoffset (same as that of ungrouped WUS); and a 2nd time slot for WUS (e.g., corresponding to WUS resource #1 for NB-IoT, WUS resource #2, #3 for MTC) is defined as [w0',w0-1], starting from w0' subframe and ends in subframe w0-1 with w0' as the latest subframe such that there is a total of valid DL subframe for the configured WUS max duration in the maximum duration. In this regard, there may be a total of valid DL subframe for the 2 times of WUS max duration that ends in subframe g0-1. If ungrouped WUS is configured, the location of the WUS resources for group WUS may be dependent on the configuration of the ungrouped WUS configuration. The ungrouped WUS freqLocation {n0, n2, or n4} can be used to indicate Pattern 1, 2 or 3 implicitly based on the predefined table. The number of WUS resources for group WUS can be M={1, 2, 3 or 4}, which requires 2 bits. The location and number of WUS resources may be jointed signaled as WUS resource patterns. With the configured WUS resource pattern, the WUS resource index increases in frequency first and time second manner relative to the legacy WUS resource (e.g., WUS resource #0 and #1 FDMed in the same time slot, and WUS resource #2 and #3 FDMed in another time slot for MTC). In addition, 1 bit is used to indicate whether WUS resource #0 for ungrouped WUS is allocated to be shared by ungrouped WUS and group WUS or not. Therefore, in total 3 bits may be utilized to indicate the number M and indices $N_{ID}^{resource}$ for non-legacy WUS resources as: if $N_{ID}^{resource}=0$ is used for group WUS, $N_{ID}^{resource}=m$ with {m=0 . . . (M−1)} and M=1, 2, 3 or 4; otherwise, $N_{ID}^{resource}=m+1$ with {m=0 . . . (M−1)} and M=1, 2, or 3. On the other hand, if ungrouped WUS is not configured, $N_{ID}^{resource}=0\sim3$ can be used for group WUS. 2 bits are used to indicate $N_{ID}^{resource}=m$ with {m=0 . . . (M−1)} and M=1, 2, 3 or 4 for WUS resources of group WUS. In addition, if the 2-bit freqLocation for WUS resource #0 is introduced for group WUS (similar as that of ungrouped WUS), the WUS resource location can be selected among Pattern 1, 2 and 3 in Table 1. Alternatively, 1 bit is introduced to choose Pattern 1 or Pattern 2 considering the similarity of 4-resource location for Pattern 2 and 3 to limit 3 bits in total for WUS resource configuration for group WUS.

TABLE 1

Patterns for WUS resource time/frequency location for group WUS

| WUS resource location | | Pattern 1 | Pattern 2 | Pattern 3 |
| --- | --- | --- | --- | --- |
| m = 0 | freqLocation | n0 | n2 | n4 |
| | timeLocation | | 1st time slot for WUS | |
| m = 1 | freqLocation | n2 | n4 | n2 |
| | timeLocation | | 1st time slot for WUS | |
| m = 2 | freqLocation | n0 | n2 | n4 |
| | timeLocation | | 2nd time slot for WUS | |
| m = 3 | freqLocation | n2 | n4 | n2 |
| | timeLocation | | 2nd time slot for WUS | |

Figure 5:
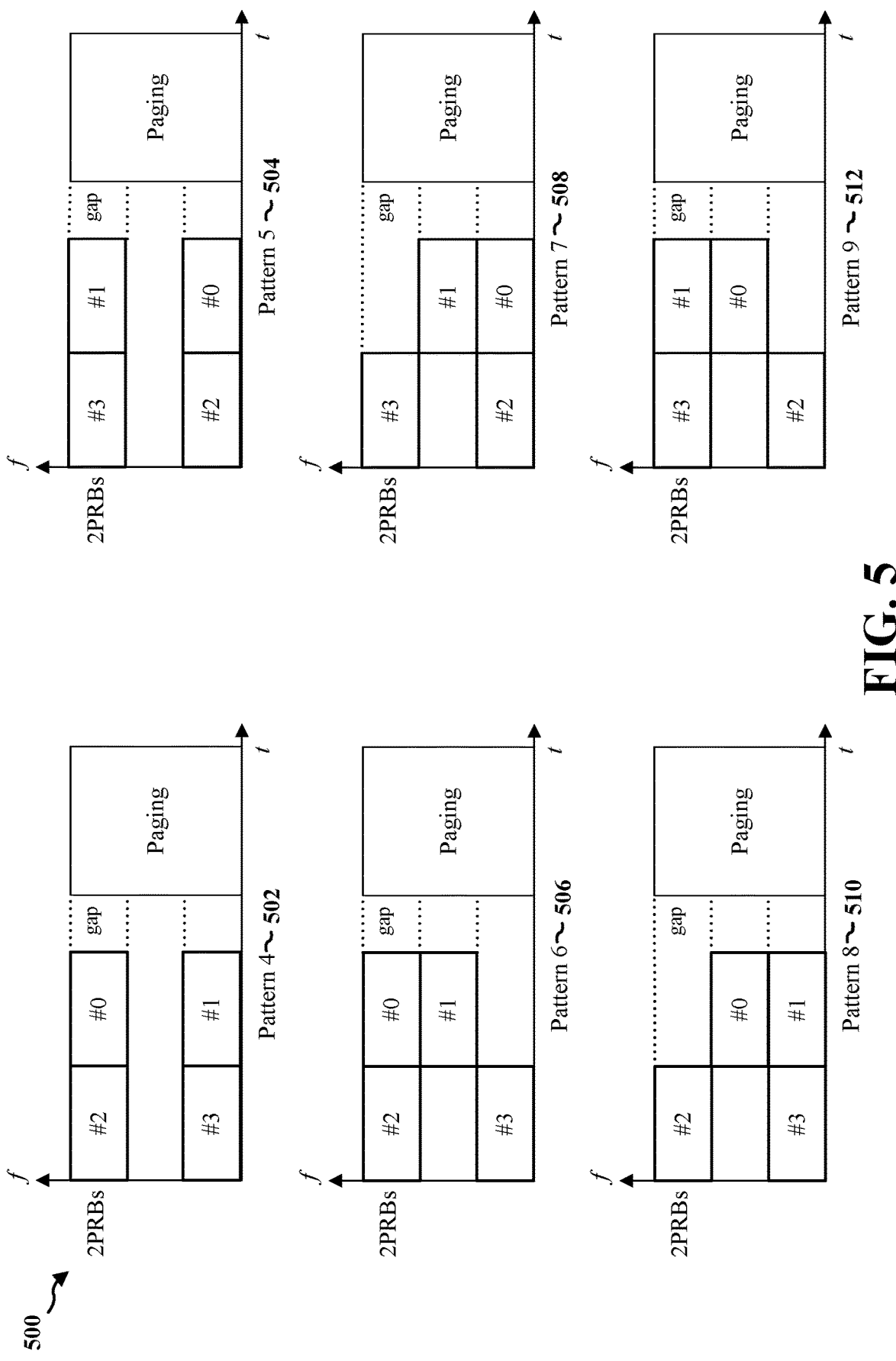
FIG. 5 illustrates additional examples of patterns of WUS resources.

FIG. 5 illustrates additional examples 500 of patterns of WUS resources. A distinction between the patterns of FIG. 5 and those of FIG. 4, is that the patterns of FIG. 5 include resources that are not consecutive in time and/or frequency. The patterns having non-consecutive mapping may allow for scheduling flexibility and may improve frequency diversity in instances where frequency hopping or alternating UE group among different WUS resources is enabled.

Figure 6:
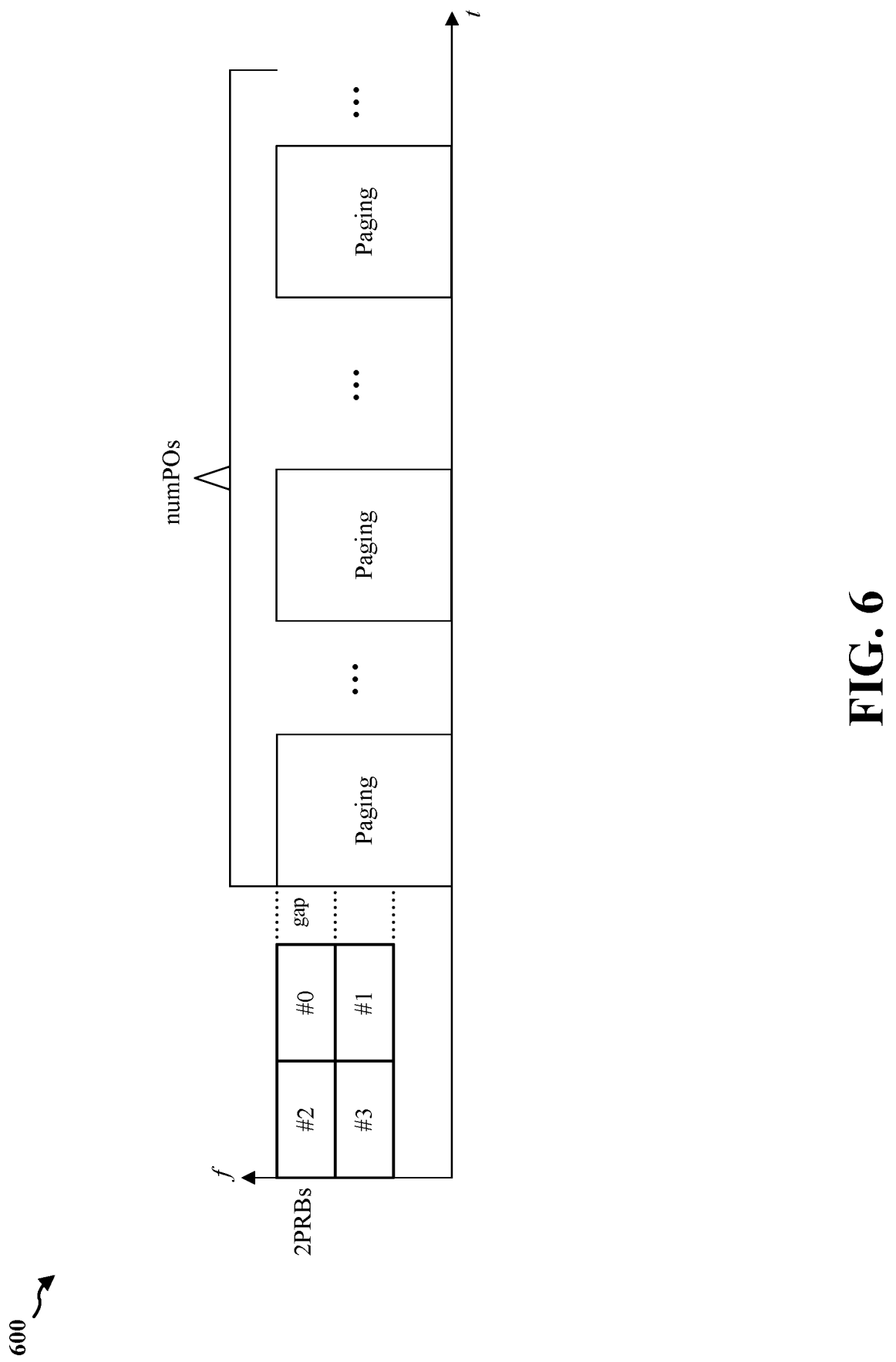
FIG. 6 illustrates an example of WUS mapping in eDRX mode.

FIG. 6 illustrates an example 600 of WUS mapping in eDRX mode. A UE may be configured by a base station for a DRX mode or eDRX. When there is no data to be transmitted between the UE and base station in either direction, e.g., no uplink or downlink transmissions, the UE may enter the DRX mode or eDRX mode in which the UE may monitor a control channel discontinuously using a sleep and wake cycle. eDRX mode is similar to DRX but has longer timer values which allows the UE to remain in a sleep cycle for a longer duration than DRX, which may increase power savings. DRX and eDRX may help to conserve battery power at the UE. Without DRX/eDRX, the UE would need to monitor the control channel in every subframe to check whether there is data for the UE. Continuous monitoring of the control channel places a demand on the UE's battery power. The base station may send a WUS to a UE in advance of a PO when the base station will transmit communication to the UE. If the UE receives a WUS, the UE may wake-up by preparing to receive the communication during the PO. If the UE does not receive a WUS, the UE may return to the sleep mode.

In some aspects, a UE that supports eDRX with the ungrouped WUS may be configured with the number of POs associated with an ungrouped WUS. Based on the configuration, the UE monitors one WUS that is associated with a group of consecutive POs for power savings. If the UE is configured with a number of POs that is equal to three, the UE will monitor a WUS and will either wake up or remain in a sleep mode for the three POs associated with the WUS based on whether the UE receives the WUS. In some aspects, for UEs that support eDRX and group WUS, when an ungrouped WUS is configured, the number of POs may be applied to eDRX UEs to enable the ungrouped and group WUS associated with the same group of consecutive POs on the same narrowband or carriers. In some aspects, when ungrouped WUS is not configured, for eDRX UEs with group WUS, the number of POs may be configured to enable the group WUS associated with the same group of consecutive POs on the same narrowband or carriers.

In some aspects, a UE may be configured to alternate between UE groups. Grouped UEs may be configured to alternate WUS UE groups among M configured WUS resources, where M=2, 3, 4. In instances where there are more than one WUS resource allocated for group WUS, e.g., M>1, the UE group(s) may be enabled to monitor the resource with predefined WUS resource index order in different POs. Alternating UE groups may be implicitly enabled when M>1 or explicitly enabled by 1 bit in SIB per cell-specific, e.g., for MTC group WUS or carrier-specific, e.g., for NB-IoT group WUS. For MTC, up to 4 WUS resources can be allocated for group WUS, i.e., M<=4; and for NB-IoT, up to 2 WUS resources can be allocated for group WUS, i.e., M<=2, which means alternating the UE groups only if M=2 for NB-IoT WUS.

There are different ways to alternate the UE groups. A first method may be to alternate all UE groups per WUS resource together (change WUS resource ID only), as illustrated as $$m = \left(m_0 + \frac{SFN + 1024H\_SFN}{T + \text{offset}}\right) \bmod M,$$

where $m=\{0, \ldots, M-1\}$ is used to identify WUS resource index for a UE group;

$m_0=\{0, \ldots, M-1\}$ is the initial WUS resource ID index for a UE group;

SFN is the radio frame index, H_SFN is the hyper-SFN;

T should be common for counting the PO index here so as to keep the UEs in same group monitoring same WUS resource m when alternating (UE still monitors the WUS based on the UE-specific DRX if configured) and Offset is used for randomization for UE-specific DRX with following possible settings:

$T = T_{cell}$ cell-specific $DRX$ and offset = 0, or $T = T_{min}$ min $UE$-specific $DRX$ and offset = 0, or $T = T_{min}$ and offset =

$LCM\left(M, \frac{T_{cell}}{T_{min}}\right)T_{min}$ ($LCM$ : least common multiple of two numbers)

with $T_{cell}$ and $T_{min}$ to be indicated in SIB respectively or $T_{cell}$ and $T_{min}$ to be predefined as the maximum and minimum value of the possible UE-specific DRX cycles respectively.

A second method may be to alternate a minimum number of UE groups based on the UE group ID (change WUS resource ID and phase ID for group WUS), as illustrated as $$g = \left(g_0 + G_{min}\frac{SFN + 1024H\_SFN}{T + \text{offset}}\right) \bmod G_{total}$$

where $g_0 = \{0, \ldots, G_{total} - 1\}$ is the initial $UE$ group index;

$G_{total} = \sum_{m=1}^{M-1} G_m$ and $G_{min} = \min_{m=0,\ldots M-1} G_m$;

$G_m$ is the number of UE groups in resource m defined as $$m = \begin{cases} 0 & \text{if } g < G_0 \\ 1 & \text{else if } G_0 \leq g < G_0 + G_1 \\ 2 & \text{else if } G_0 + G_1 \leq g < G_0 + G_1 + G_2 \\ 3 & \text{otherwise} \end{cases}$$

$m = \{0, \ldots, M-1\}$ is used to identify WUS resource index for a UE group;

T should be common for counting the PO index here so as to keep the UEs in same group monitoring same WUS resource m when alternating (UE still monitors the WUS based on the UE-specific DRX if configured) and Offset is used for randomization for UE-specific DRX with following possible settings:

$T = T_{cell}$ cell-specific $DRX$ and offset = 0, or $T = T_{min}$ min $UE$-specific $DRX$ and offset = 0, or $T = T_{min}$ and offset = $LCM\left(\frac{G_{total}}{G_{min}}, \frac{T_{cell}}{T_{min}}\right)T_{min}$ with $T_{cell}$ and $T_{min}$ to be indicated in SIB respectively or $T_{cell}$ and $T_{min}$ to be predefined as the maximum and minimum value of the possible UE-specific DRX cycles respectively.

The first method includes a change of the resource ID, while keeping the same phase of the WUS sequence, which is based on the group ID in a WUS resource, and does not change the UE groups allocated in one WUS resource. Especially when considering service-based UE grouping, the UE groups with different services have different paging probability. It is more reasonable to use different WUS resources to separate the UE groups with different services to avoid the impact of services with large paging probability on the other services. The second method may include a change of the resource ID and phase ID, and changes the min UE groups, which may result in mixed services in same WUS resource. The first method may have a potential impact on ungrouped WUS UEs if a larger number of UE groups move into the ungrouped WUS resource and ungrouped WUS as the common WUS will wake up ungrouped and group WUS UEs together. The second method may be used to maintain the number of UE groups in one WUS resource.

In some aspects, using first method or second method may be based on whether ungrouped WUS is configured or not, or ungrouped WUS is configured as common WUS for group WUS in the WUS resource #0 or not. For example, if ungrouped WUS is not configured as common WUS for group WUS in the WUS resource #0, the first method is used; otherwise, the second method is used. In some aspects, using the first method or second method may be based on whether service-based UE grouping is used for group WUS or not. For example, if service-based UE grouping is used for group WUS, the first method is used; otherwise, the second method is used.

Alternatively, the first method can be defined based on the PO index as $m=(m_0+PO_{Index}+\text{offset}) \bmod M$ and the second method can be defined based on the PO index as $g=(g_0+G_{min}(PO_{Index}+\text{offset})) \bmod G_{total}$, where $PO_{Index}$ is the index of the PO within one DRX cycle as $PO_{Index}=(SFN/T \cdot nB+i_s) \bmod nB$ T should be common for counting the PO index here so as to keep the UEs in same group monitoring same WUS resource m when alternating (UE still monitors the WUS based on the UE-specific DRX if configured) and Offset is used for randomization for UE-specific DRX with following possible settings:

$$T = T_{cell} \text{ cell-specific } DRX \text{ and offset} = 0,$$

$$\text{or } T = T_{min} \text{ min } UE\text{-specific } DRX \text{ and offset} = 0,$$

$$\text{or } T = T_{min},$$

$$\text{offset} = \frac{SFN + 1024H\_SFN}{T_{min} + LCM\left(M, \frac{T_{cell}}{T_{min}}\right)T_{min}} \text{ for the first method and offset} =$$

$$\frac{SFN + 1024H\_SFN}{T_{min} + LCM\left(\frac{G_{total}}{G_{min}}, \frac{T_{cell}}{T_{min}}\right)T_{min}} \text{ for the second method.}$$

When the offset=0, the UE group may monitor the m-th WUS resource at the i-th PO with m=MOD(m0+i,M), where m0 is the initial WUS resource index for the UE group. For example, when M=2,

| m-WUS resource monitored at i-th PO | i = 0 | 1 | 2 | 3 | 4 | 5 | 6 | 7 |
|---|---|---|---|---|---|---|---|---|
| UE group 0 with m0 = 0 | m = 0 | m = 1 | m = 0 | m = 1 | m = 0 | m = 1 | m = 0 | m = 1 |
| UE group 0 with m0 = 1 | m = 1 | m = 0 | m = 1 | m = 0 | m = 1 | m = 0 | m = 1 | m = 0 |

In another example, when M=4,

| m-WUS resource monitored at i-th PO | i = 0 | 1 | 2 | 3 | 4 | 5 | 6 | 7 |
|---|---|---|---|---|---|---|---|---|
| UE group 0 with m0 = 0 | m = 0 | m = 1 | m = 0 | m = 1 | m = 0 | m = 1 | m = 0 | m = 1 |
| UE group 0 with m0 = 1 | m = 1 | m = 0 | m = 1 | m = 0 | m = 1 | m = 0 | m = 1 | m = 0 |

In instances where the UE changes the monitored WUS resource, as shown above, the WUS sequence detected by the UE may change or remain the same. In some aspects, the WUS sequence is changed when the UE group monitors a different WUS resource. When the ungrouped WUS is configured, UEs that support ungrouped WUS may only detect ungrouped WUS sequence in the WUS resource #0. The group WUS sequences in WUS resource #0 may use the same scrambling sequence as the ungrouped WUS sequence but differentiated by phase shifts, e.g., w_(UE_group_index) (m')=w(m')exp(j2πgm/G), where w(m') is the sequence for ungrouped WUS sequence and exp(j2πgm/G) is the phase shift with G=132, g=14*(UE_group_index+1), 0≤UE_group_index≤7 and g=126 for common WUS sequence for the UEs monitoring the same WUS resource. When UEs that support grouping alternate the monitored WUS resource, the WUS sequence may use the scrambling sequence associated with a different WUS resource index.

In instances where the WUS sequence is not changed for the UE group, and is the same for all alternating WUS resources, the same WUS sequence may be allocated for the UE group regardless of which WUS resource is monitored. If UEs that do not support grouping are not monitoring the ungrouped WUS sequence, then the group WUS sequence may be pre-allocated to different UE groups.

In some instances, all of the UE groups in the same WUS resource may alternate the monitored WUS resource index. To alternate the monitored WUS resource index, the UE's within a particular UE group may monitor for the WUS using a scrambling sequence that changes based on the WUS resource ID to be monitored. The phase shift of the WUS group sequence may not change when the UE groups monitor different WUS resources. The phase shift may be based on a UE group. For example, the phase shift (e.g., g=14*(UE_group_index+1)) may be configured to differentiate the WUS sequence in the same WUS resource with the UE_group_index={0, . . . , 7}. In an example, the scrambling sequence may be {1, −1, j, −j} with a 2-bit scrambling initialization seed, which may be determined based on the WUS resource ID m={0, 1, 2, 3}. Thus, all UE groups may be alternated in the same WUS resource together such that only the scrambling sequence (e.g., {1, −1, j, −j}) is changed based on the monitored WUS resource index, while keeping the phase shift, which is based on the group ID in the WUS resource, for the group WUS sequence the same. These aspects may allow for a reduction of complexity for WUS sequence generation.

Figure 22:
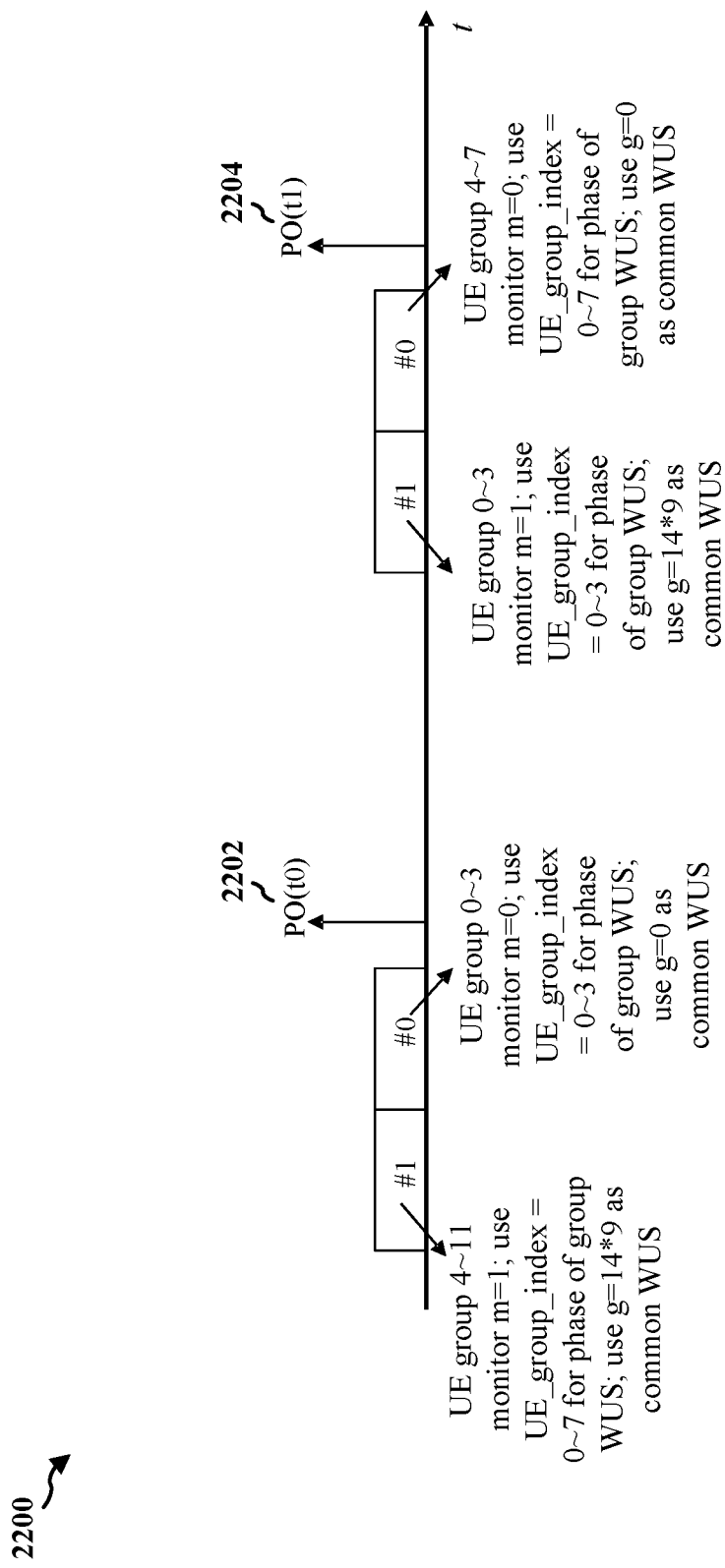
FIG. 22 illustrates an example of UE groups alternating the monitored WUS resource.

In some instances a common WUS sequence may be configured. If a common WUS sequence is configured, the common WUS sequence may be different based on the monitored WUS resource ID. For example, if alternating to a legacy WUS resource with m=0, the common WUS sequence may be configured as the legacy WUS resource (e.g., g=0, m=0) or may be configured as the non-legacy WUS sequence (e.g., phase g=14*9, m=0). In some instances, when alternating to the non-legacy WUS resource with m>0, the common WUS sequence may be the non-legacy common WUS sequence having a phase g=14*9, and the value of m may be determined based on the WUS resources available. In some instances, for example as shown in the diagram 2200 of FIG. 22, there may be 12 UE groups allocated into resources #0 and #1, such that M=2 WUS resources in total. At a first point in time, e.g., a first monitoring occasion, the first resource (e.g., #0) may be used by UE groups 0~3 to monitor for a WUS with the remaining UE groups 4~11 monitoring the second resource (e.g., #1) for a WUS. For example, for the initial PO 2202 of FIG. 23 (e.g., PO(t0)) the UE group 0-3 may monitor the #0 resource while the remaining UE groups 4~11 monitor the #1 resource. In the next PO 2204 of FIG. 23 (e.g., PO(t1)), when the UE groups alternate to monitoring a different resource for the WUS, the UE groups 4~7 may alternate and monitor the resource #0, while the UE group 0~3 may alternate and monitor the resource #1. A corresponding amount of UE groups (e.g., UE groups 4~7) may alternate to monitor the resource #0 when different resources have been configured to have a different number of UE groups. In the example of FIG. 22, only UE groups 4~7 out of groups 4~11 alternated to monitor the resource #0. The phase shift may be kept the same when alternating or hopping between resources.

A UE group may alternate or hop among the WUS resources. Such hopping among WUS resources may be explicitly or implicitly enabled for the UEs in the UE group. In some instances, the UE group alternating or hopping among the WUS resources may be implicitly enabled when, for example, M>1, which may enable UE group alternating among M WUS resources for group WUS. Therefore, a UE within the UE group may determine, in an implicit manner, that the UE should monitor for the WUS by hopping or alternating among WUS resources based on the number of WUS resources.

A UE may determine to perform alternating or hopping among WUS resources when monitoring for a WUS based on an explicit indication from a base station. For example, a WUS resource pattern configuration may be indicated by a SIB. For example, in instances where m=0 is allocated for group WUS, then $N_{ID}^{resource}$=m with m=0~M-1 and M=2, 3 or 4 may be used for alternating the UE group.

In some instances, as shown in the diagram 2300 of FIG. 23, for NB-IoT where M=2, the resources #0 and #1 may be used for alternating the UE group. In some instances, for MTC where M=2, 3, or 4, the resources #0 and #1 may be used for alternating the UE group when M=2; the resources #0, #1, #2 may be used for alternating the UE group when M=3; or the resources #0, #1, #2, #3 may be used for alternating the UE group when M=4. In some instances if the legacy WUS sequence is not configured as a common WUS sequence, then there is no impact. However, in instances where the legacy WUS sequence is configured as a common WUS sequence there may be a negative impact when more UE groups are moved into legacy WUS resource sharing with the legacy WUS, and the changing (e.g., alternating or hopping) of the monitored WUS resource per PO may reduce the probability of such an occurrence.

In some instances, where m=0 is not allocated for group WUS, then WUS resource ID $N_{ID}^{resource}$=m+1 with m=0~M-1 and M=2 or 3 may be used for alternating UE groups.

In some instances, as shown in the diagram 2310 of FIG. 23, for NB-IoT there may be only 1 WUS resource and alternating or hopping may not be enabled. In some instances, for MTC where M=2 or 3, the resources #1 or #2 may be used for alternating the UE group when M=2, or the resources #1, #2, or #3 may be used for alternating the UE group when M=3. In the example of diagram 2310 of FIG. 23, since the #0 resource is not allocated for group WUS, then the UE groups may only alternate between #1, #2, or #3.

Further enhancement may be provided if service-based grouping is used for group WUS. Assuming there are S types of services (each service associated to a subset of groups), it would be better to alternate the UE groups that belong to the same service type s (e.g., with similar paging probability) among the corresponding WUS resources, while not alternating the UE groups with different services.

In some aspects, all of the UE groups per WUS resource may belong to the same service type s. There may be more than one WUS resource that belongs to the same service type s. The first method may alternate all UE groups per WUS resource together belong to the same service type s (change WUS resource ID only), as illustrated as $$m_s = \left(m_{0,s} + \frac{SFN + 1024H\_SFN}{T + \text{offset}}\right) \mod M_s,$$

where $m_s=\{0, \ldots, M_s-1\}$ is used to identify WUS resource index for a UE group belong to the same service type s;

$m_{0,s}=\{0, \ldots, M_s-1\}$ is the initial WUS resource ID index for a UE group belong to the same service type s;

T and offset are set as:

$T = T_{max,s}$ max UE-specific DRX of the

UEs belong to same service type s and offset = 0, $T = T_{min,s}$ min UE-specific DRX of the UEs belong to same service type s and offset = 0, or $T = T_{min,s}$ and offset = $LCM\left(M_s, \frac{T_{max,s}}{T_{min,s}}\right)T_{min,s}$ with $T_{max,s}$ and $T_{min,s}$ to be indicated in SIB respectively or $T_{max,s}$ and $T_{min,s}$ to be predefined as the maximum and minimum value of the possible UE-specific DRX cycles respectively.

The second method is to alternate only minimum number of UE groups based on the UE group $g_{x,s}$ belong to same service type s, as illustrated as $$x = \left(x_0 + G_{min,s} \frac{SFN + 1024H\_SFN}{T + \text{offset}}\right) \mod G_{total,s}$$

where $x_s = \{0, \ldots, G_{total,s} - 1\}$ is the index of UE group $g_{x,s}$;

$x_{0,s} = \{0, \ldots, G_{total,s} - 1\}$ is the initial index of UE group $g_{x,s}$;

$G_{total,s} = \sum_{m=1}^{M-1} G_{m,s}$ and $G_{min,s} = \min_{m=0,\ldots M-1} G_{m,s}$;

$G_{m,s}$ is the number of UE groups in resource m belong to the same service type s defined as $$m = \begin{cases} 0 & \text{if } g < G_0 \\ 1 & \text{else if } G_0 \leq g < G_0 + G_1 \\ 2 & \text{else if } G_0 + G_1 \leq g < G_0 + G_1 + G_2 \\ 3 & \text{otherwise} \end{cases}$$

$m = \{0, \ldots, M - 1\}$ is used to identify WUS resource index for a UE group belong to the same service type s;

T and offset are set as:

$T = T_{max,s}$ max UE-specific DRX of the

UEs belong to same service type s and offset = 0, $T = T_{min,s}$ min UE-specific DRX of the UEs belong to same service type s and offset = 0, or $T = T_{min,s}$ and offset = $LCM\left(M_s, \frac{T_{max,s}}{T_{min,s}}\right)T_{min,s}$ with $T_{max,s}$ and $T_{min,s}$ to be indicated in SIB respectively or $T_{max,s}$ and $T_{min,s}$ to be predefined as the maximum and minimum value of the possible UE-specific DRX cycles respectively.

Figure 7:
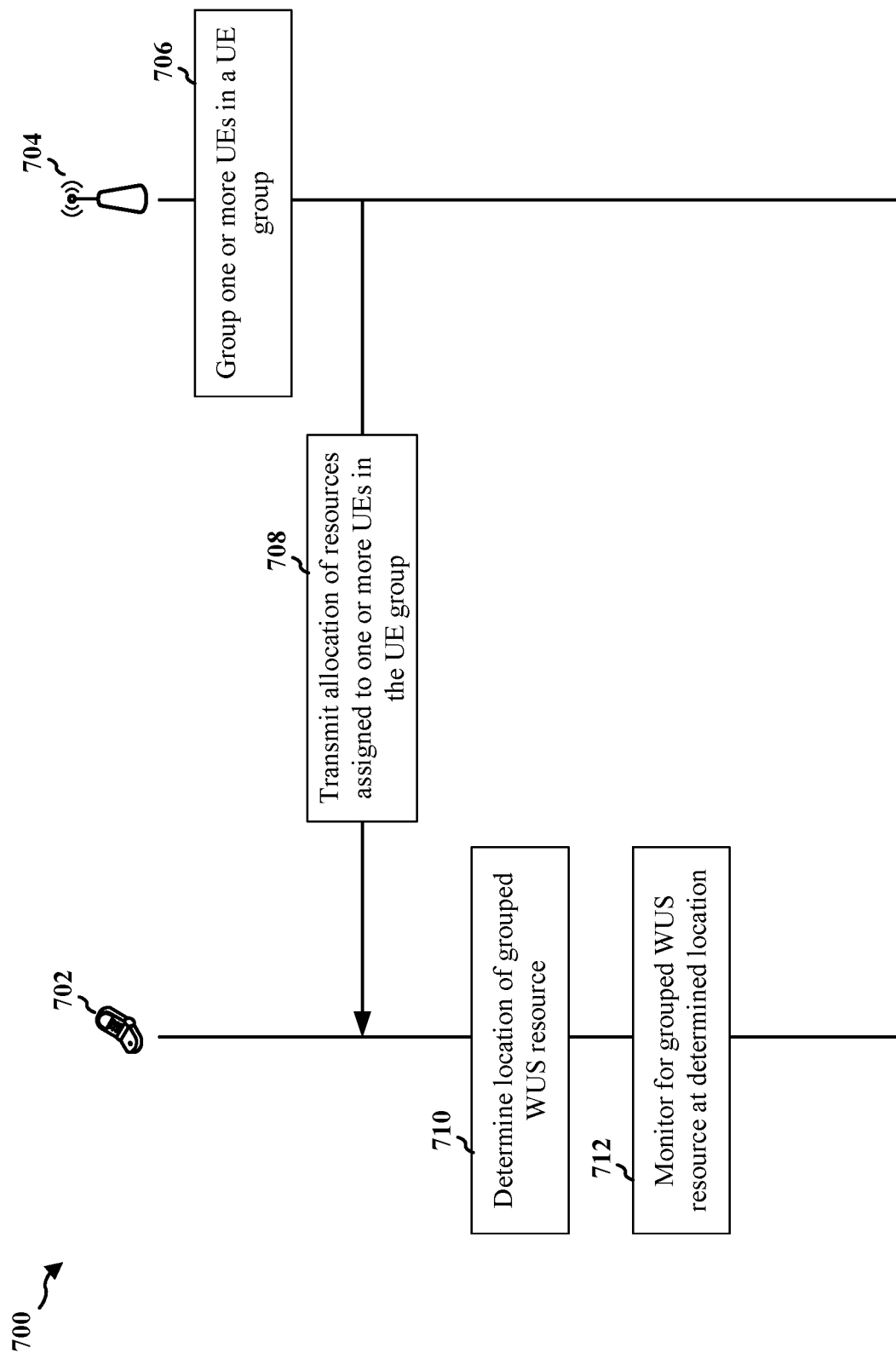
FIG. 7 is a diagram illustrating transmissions between a base station and a UE.

FIG. 7 is a diagram 700 illustrating transmission between a base station and a UE. The diagram 700 includes a UE 702 and a base station 704. In some aspects, the base station 704, at 706, may group one or more UEs in a UE group. The base station 704 may transmit, to one or more UEs in the UE group, an allocation of resources assigned to the one or more UEs in the UE group. The allocation of resources may comprise a group WUS resource within a set of WUS resources associated with a PO. The set of WUS resources may include a ungrouped WUS, where the location of the group WUS may be based on a frequency location of the ungrouped WUS. In some aspects, the location of the group WUS resource may be based on at least one of the ungrouped WUS having the frequency location in a first resource block and a second resource block of a six resource block bandwidth, the ungrouped WUS having the frequency location in a third resource block and a fourth resource block of the six resource block bandwidth, or the ungrouped WUS having the frequency location in a fifth resource block and a sixth resource block of the six resource block bandwidth. In some aspects, the set of WUS resources may not include an ungrouped WUS. In such instances, the location of the group WUS resource may be based on information indicated in a configuration for the group WUS. The set of WUS resources may be consecutive in time and frequency. In some aspects, the set of WUS resources may be non-consecutive in time or frequency.

The UE 702, at 710, may determine a location of the group WUS resource within a set of WUS resources. The set of WUS resources may be associated with a paging occasion. In some aspects, the set of WUS resources may include an ungrouped WUS. The location of the group WUS resource may be determined based on a frequency location of the ungrouped WUS.

The UE 702, at 712, may monitor for a group WUS at the determined location in the allocation of resources.

Figure 8:
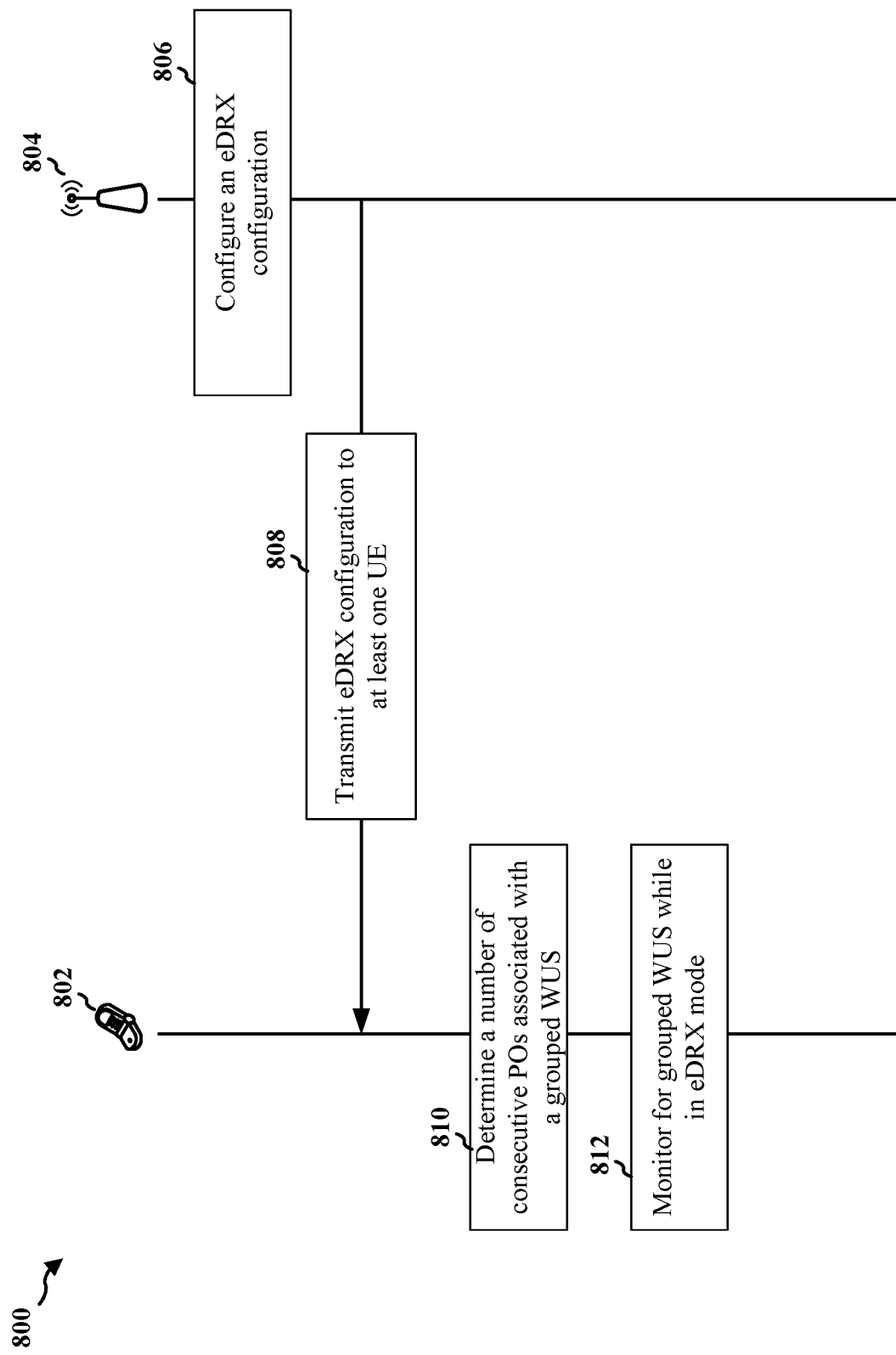
FIG. 8 is a diagram illustrating transmissions between a base station and a UE.

FIG. 8 is a diagram 800 illustrating transmission between a base station and a UE. The diagram 800 includes a UE 802 and a base station 804. In some aspects, the base station 804, at 806, may configure an eDRX configuration. The eDRX configuration may include a number of consecutive POs associated with a group WUS. In some aspects, the eDRX configuration may include a configured number of consecutive POs associated with an ungrouped WUS. The number of consecutive POs associated with the group WUS may be based on the configured number of consecutive POs associated with the ungrouped WUS. In some aspects, the eDRX configuration may indicate the number of consecutive POs associated for the group WUS.

The base station 804, at 808, may transmit the eDRX configuration to at least one UE. The eDRX configuration may configure the at least one UE for eDRX mode.

The UE 802, after receiving the eDRX configuration, UE may determine, at 810, a number of consecutive POs associated with a group WUS. In some aspects, the eDRX configuration may indicate the number of consecutive POs associated for the group WUS.

The UE 802, at 812, may monitor for the group WUS while in eDRX mode based on the determined number of consecutive POs. In some aspects, the eDRX configuration may include a configured number of consecutive POs associated with an ungrouped WUS. The UE may determine the number of consecutive POs associated with the group WUS based on the configured number of consecutive POs associated with the ungrouped WUS.

Figure 9:
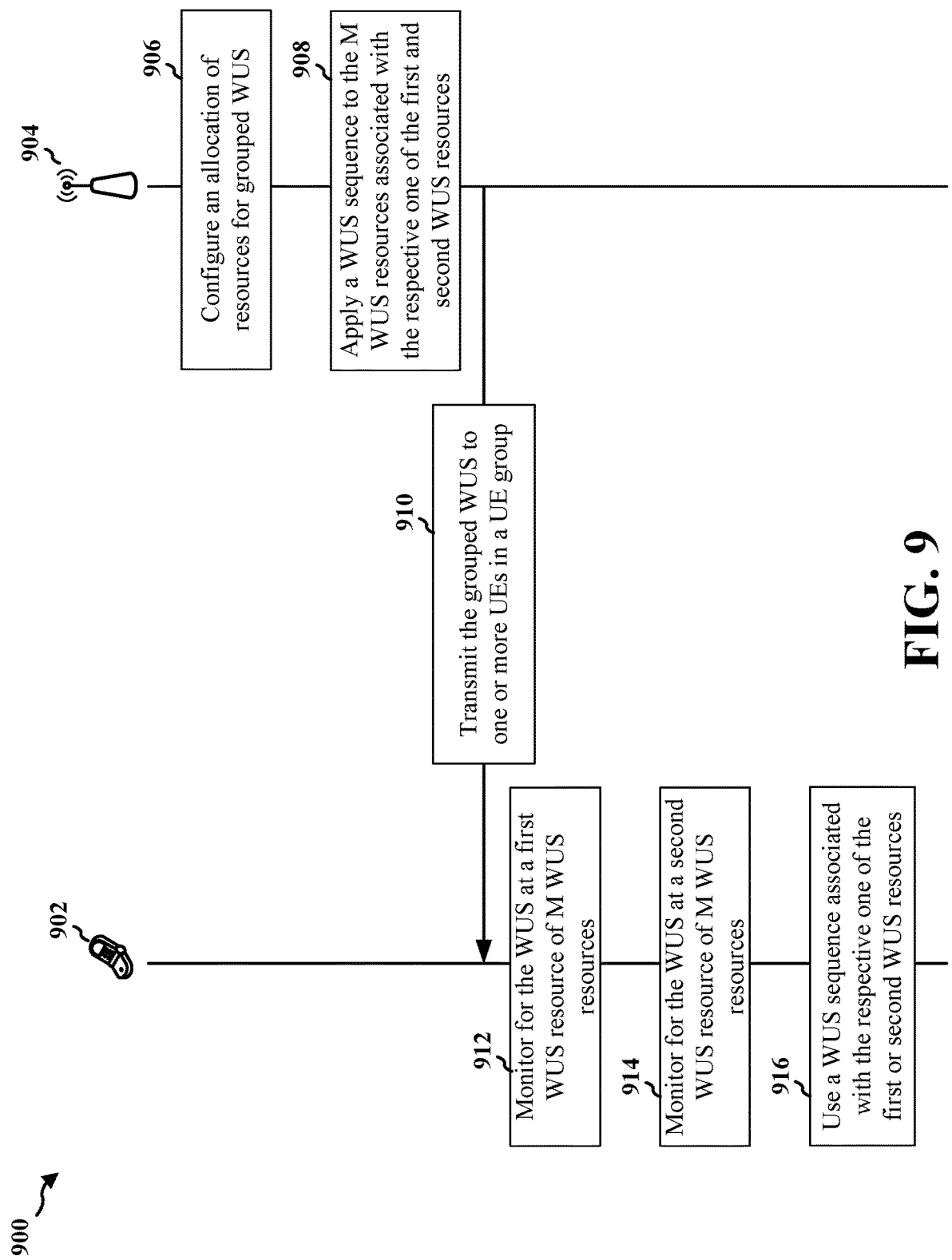
FIG. 9 is a diagram illustrating transmissions between a base station and a UE.

FIG. 9 is a diagram 900 illustrating transmission between a base station and a UE. The diagram 900 includes a UE 902 and a base station 904. In some aspects, the base station 904, at 906, may configure an allocation of resources for a group WUS associated with one or more UEs in a UE group. A first WUS resource of M WUS resources may be associated with a first PO. A second WUS resource of M WUS resources may be associated with a second PO. In some aspects, a same WUS sequence may be allocated for the UE group to monitor any of the M WUS resources.

In some aspects, the base station 904, at 908, may apply a WUS sequence to the M WUS resources associated with the respective one of the first or second WUS resources. The WUS sequence may further include a scrambling sequence associated with the respective one of the first or second WUS resources.

The base station 904, at 910, may transmit the group WUS to the one or more UEs in the UE group. In some aspects, the base station may transmit the group WUS associated with the one or more UEs at different POs using a pattern associated with a location of the M WUS resources.

The UE 902, at 912, may monitor for the WUS at a first WUS resource of M WUS resources for a first paging opportunity.

The UE 902, at 914, may monitor for the WUS at a second WUS resource of M WUS resources for a second paging opportunity. In some aspects, the UE may monitor for the WUS at different POs using a pattern associated with a location of the M WUS resources. The pattern associated with the M WUS resources may be determined at least based on a discontinuous reception cycle indicated in system information. In some aspects, a same WUS sequence may be allocated for the UE group to monitor any of the M WUS resources.

In some aspects, the UE 902, at 916, may use a WUS sequence associated with the respective one of the first or second WUS resources. The WUS sequence may further include a scrambling sequence associated with the respective one of the first or second WUS resources.

Figure 10:
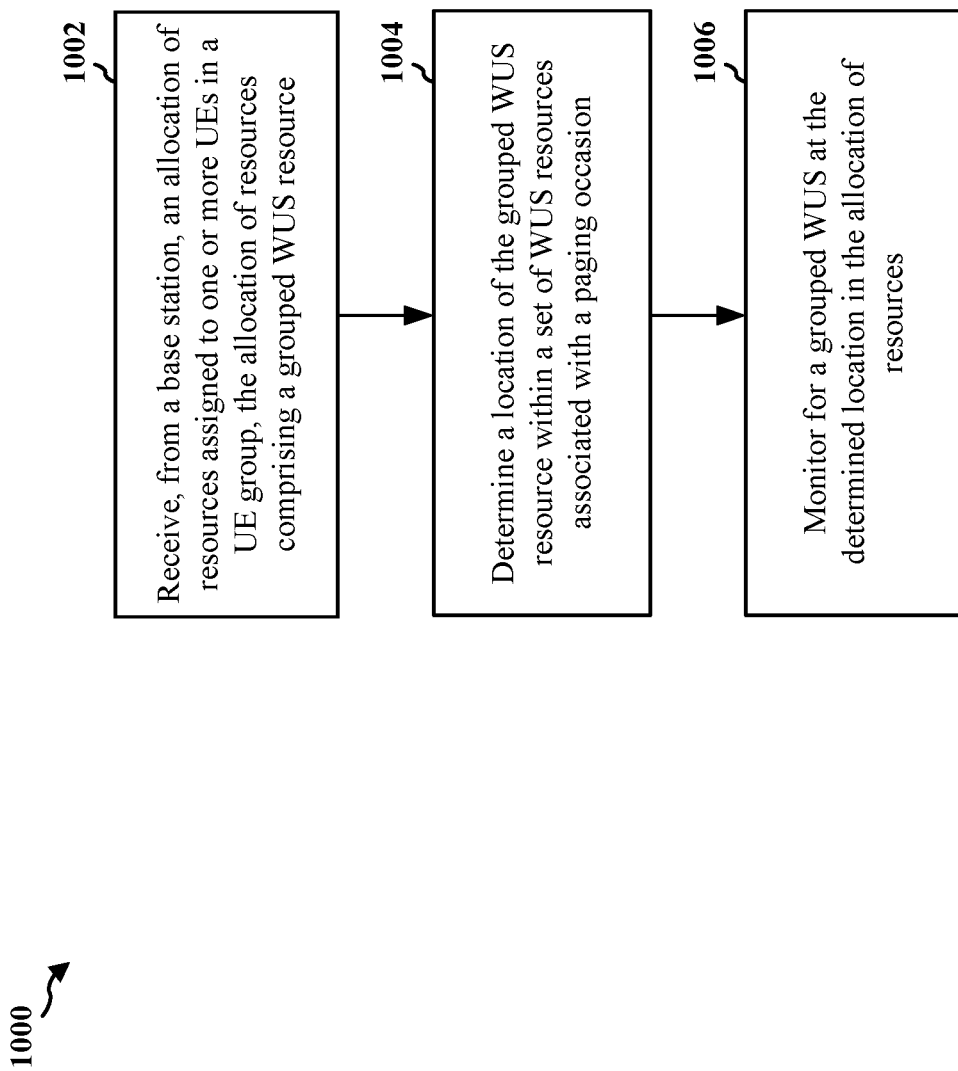
FIG. 10 is a flowchart of a method of wireless communication.

FIG. 10 is a flowchart of a method 1000 of wireless communication. The method may be performed by a UE or a component of a UE (e.g., the UE 104, 350, 702, 802, 902, which may include the memory 360 and which may be the entire UE 350 or a component of the UE 350, such as the TX processor 368, the RX processor 356, and/or the controller/processor 359). According to various aspects, one or more of the illustrated operations of the method 1000 may be omitted, transposed, and/or contemporaneously performed. The method may enable a UE to monitor for a group WUS at a determined location within an allocation of resources.

At 1002, the UE may receive an allocation of resources assigned to one or more UEs in a UE group. The allocation of resources may comprise a group WUS resource. The UE may receive the allocation of resources from a base station.

At 1004, the UE may determine a location of the group WUS resource within a set of WUS resources. The set of WUS resources may be associated with a paging occasion. In some aspects, the set of WUS resources may include an ungrouped WUS. The location of the group WUS resource may be determined based on a frequency location of the ungrouped WUS. In some aspects, the location of the group WUS resource is determined based on the ungrouped WUS having the frequency location in a first resource block and a second resource block of a six resource block bandwidth. In some aspects, the location of the group WUS resource may be determined based on the ungrouped WUS having the frequency location in a third resource block and a fourth resource block of the six resource block bandwidth. In some aspects, the location of the group WUS resource may be determined based on the ungrouped WUS having the frequency location in a fifth resource block and a sixth resource block of the six resource block bandwidth. In some aspects, the location of the group WUS resource may be determined based on at least one of the ungrouped WUS having the frequency location in a first resource block and a second resource block of a six resource block bandwidth, the ungrouped WUS having the frequency location in a third resource block and a fourth resource block of the six resource block bandwidth, or the ungrouped WUS having the frequency location in a fifth resource block and a sixth resource block of the six resource block bandwidth. In some aspects, the set of WUS resources may not include an ungrouped WUS, such that the location of the group WUS resource may be determined based on information indicated in a configuration for the group WUS. The set of WUS resources may be consecutive in time and frequency, e.g., for example, as shown in FIG. 4. In some aspects, the set of WUS resources may be non-consecutive in time or frequency, e.g., for example, as shown in FIG. 5.

At 1006, the UE may monitor for a group WUS at the determined location in the allocation of resources.

Figure 11:
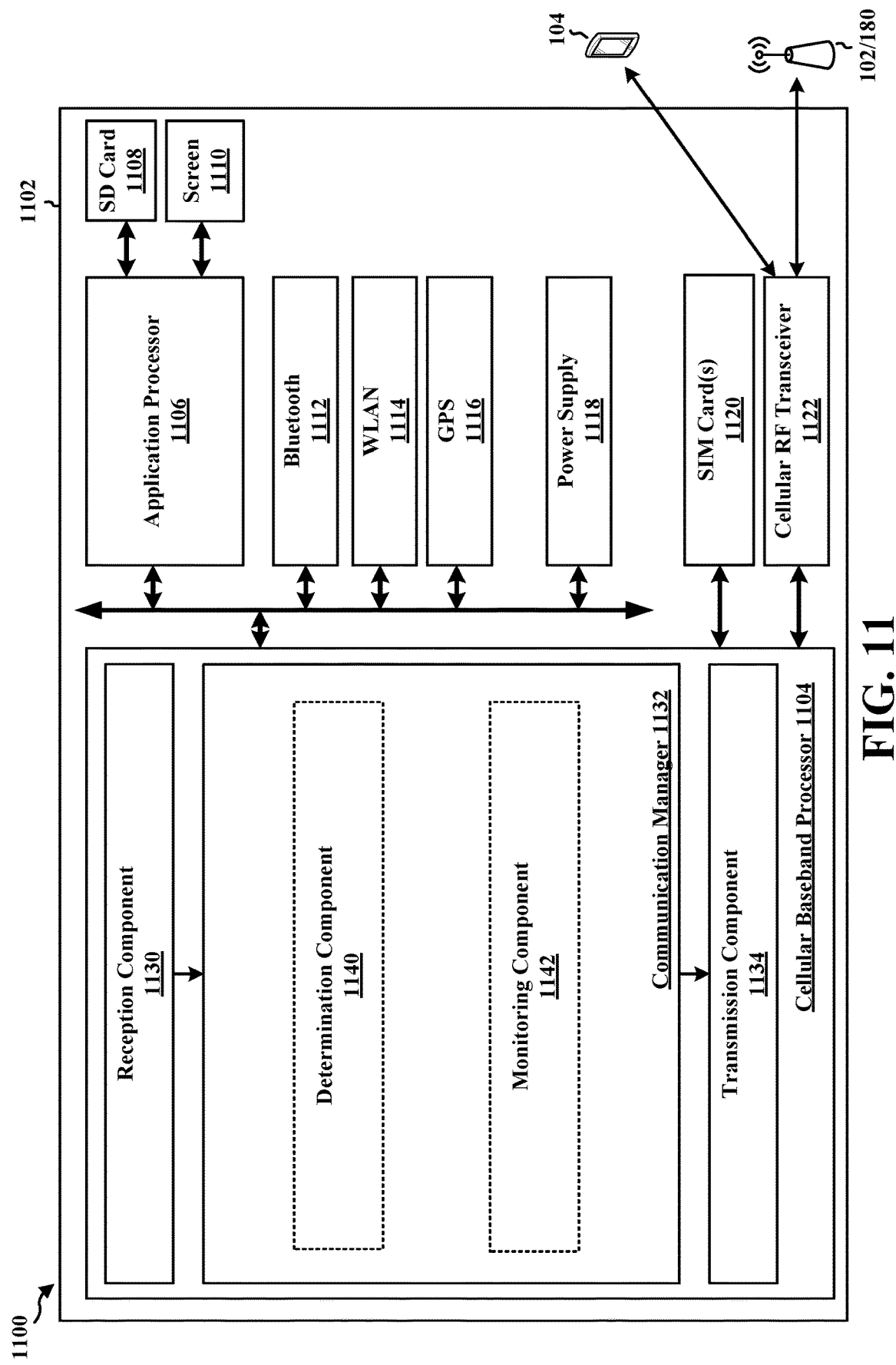
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforementioned additional modules of the apparatus 1102.

The reception component 1130 is configured to receive, from a base station (e.g., 102/180), an allocation of resources assigned to one or more UEs in a UE group, in which the allocation of resources includes a group WUS resource. The communication manager 1132 includes a determination component 1140 that is configured to determine a location of the group WUS resource within a set of WUS resources associated with a paging occasion, e.g., as described in connection with block 1004 of the method 1000 of FIG. 10. The communication manager 1132 further includes a monitoring component 1142 that receives input in the form of the determined location from the determination component 1140 and is configured to monitor for a group WUS at the determined location in the allocation of resources, e.g., as described in connection with block 1006 of the method 1000 of FIG. 10.

The apparatus may include additional components that perform each of the blocks of the algorithm in the aforementioned flowchart of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, an allocation of resources assigned to one or more UEs in a UE group, the allocation of resources comprising a group WUS resource; means for determining a location of the group WUS resource within a set of WUS resources associated with a paging occasion; and means for monitoring for a group WUS at the determined location in the allocation of resources. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
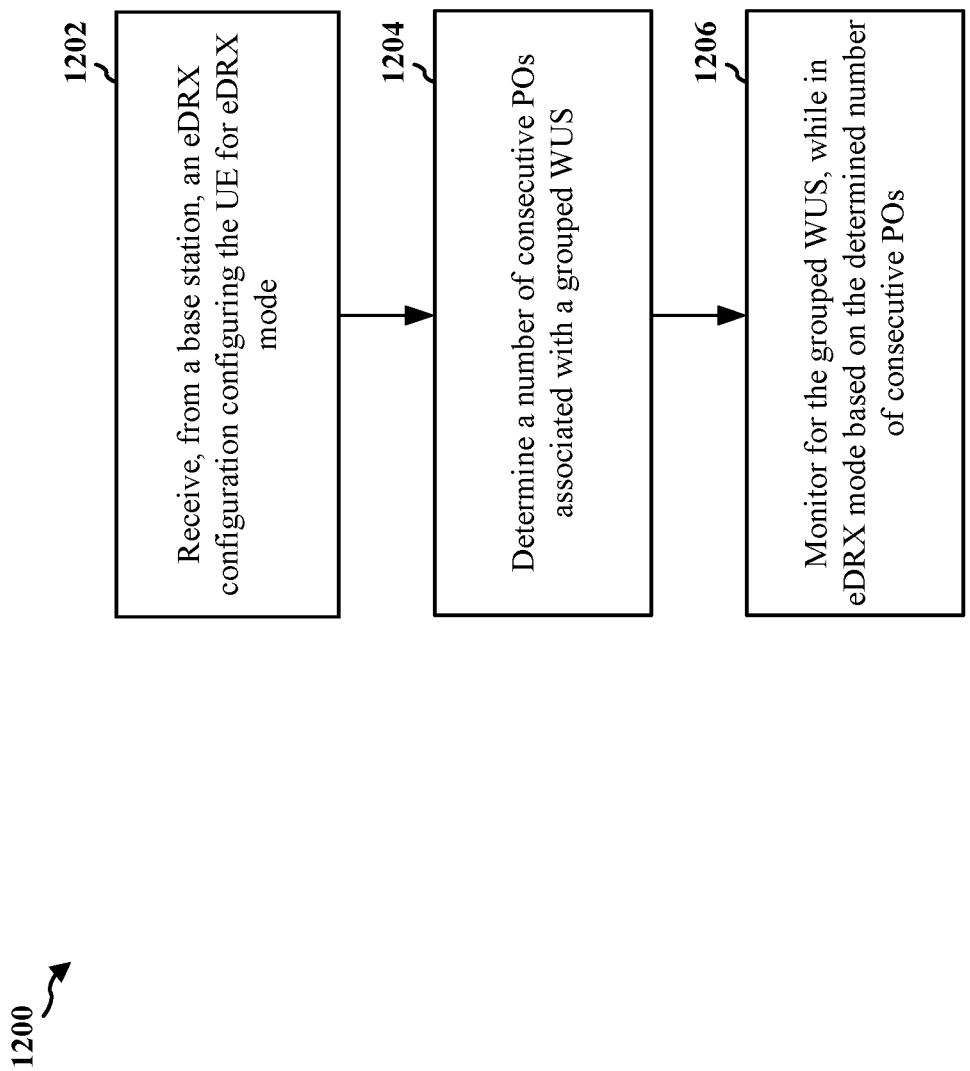
FIG. 12 is a flowchart of a method of wireless communication.

FIG. 12 is a flowchart of a method 1200 of wireless communication. The method may be performed by a UE or a component of a UE (e.g., the UE 104, 350, 702, 802, 902, which may include the memory 360 and which may be the entire UE 350 or a component of the UE 350, such as the TX processor 368, the RX processor 356, and/or the controller/processor 359). According to various aspects, one or more of the illustrated operations of the method 1200 may be omitted, transposed, and/or contemporaneously performed. The method may enable a UE to monitor for a group WUS while in eDRX mode.

At 1202, the UE may receive an eDRX configuration. The eDRX configuration may configure the UE for eDRX mode. The UE may receive the eDRX configuration from the base station.

At 1204, the UE may determine a number of consecutive POs associated with a group WUS. In some aspects, the eDRX configuration may indicate the number of consecutive POs associated for the group WUS.

At 1206, the UE may monitor for the group WUS while in eDRX mode based on the determined number of consecutive POs. In some aspects, the eDRX configuration may include a configured number of consecutive POs associated with an ungrouped WUS. The UE may determine the number of consecutive POs associated with the group WUS based on the configured number of consecutive POs associated with the ungrouped WUS.

Figure 13:
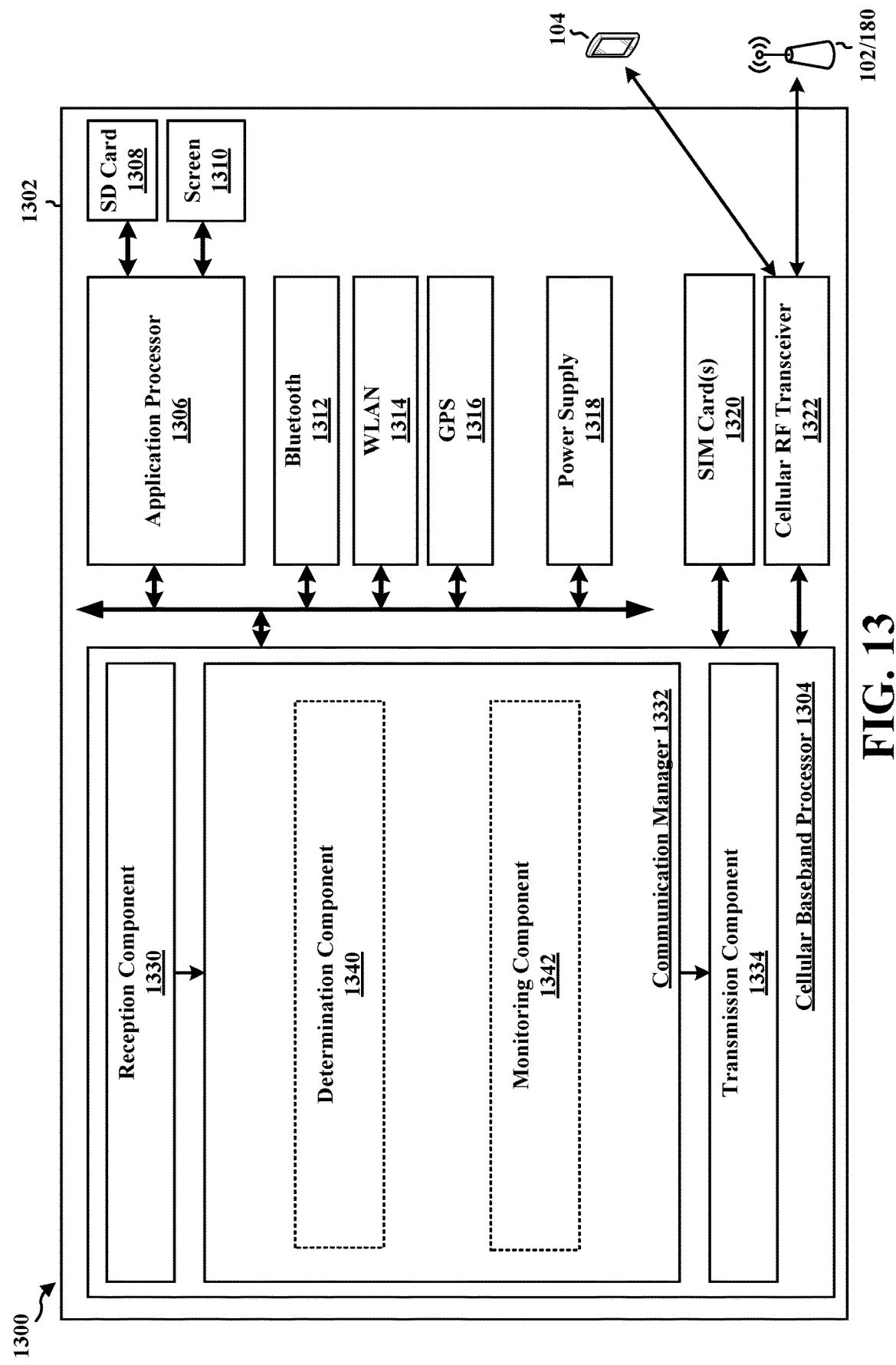
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforementioned additional modules of the apparatus 1302.

The reception component 1330 is configured to receive, from a base station (e.g., 102/180), an eDRX configuration that configures the UE for an eDRX mode, e.g., as described in connection with block 1202 of the method 1200 of FIG. 12. The communication manager 1332 includes a determination component 1340 that is configured to determine a number of consecutive POs associated with a group WUS, e.g., as described in connection with block 1204 of the method 1200 of FIG. 12. The communication manager 1332 further includes a monitoring component 1342 that receives input in the form of the number of consecutive POs from the determination component 1340 and is configured to monitor for the group WUS, while in the eDRX mode based on the number of consecutive POs, e.g., as described in connection with block 1206 of the method 1200 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving, from a base station, an eDRX configuration that configures the UE for an eDRX mode; means for determining a number of consecutive POs associated with a group WUS; and means for monitoring for the group WUS, while in the eDRX mode based on the number of consecutive POs. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
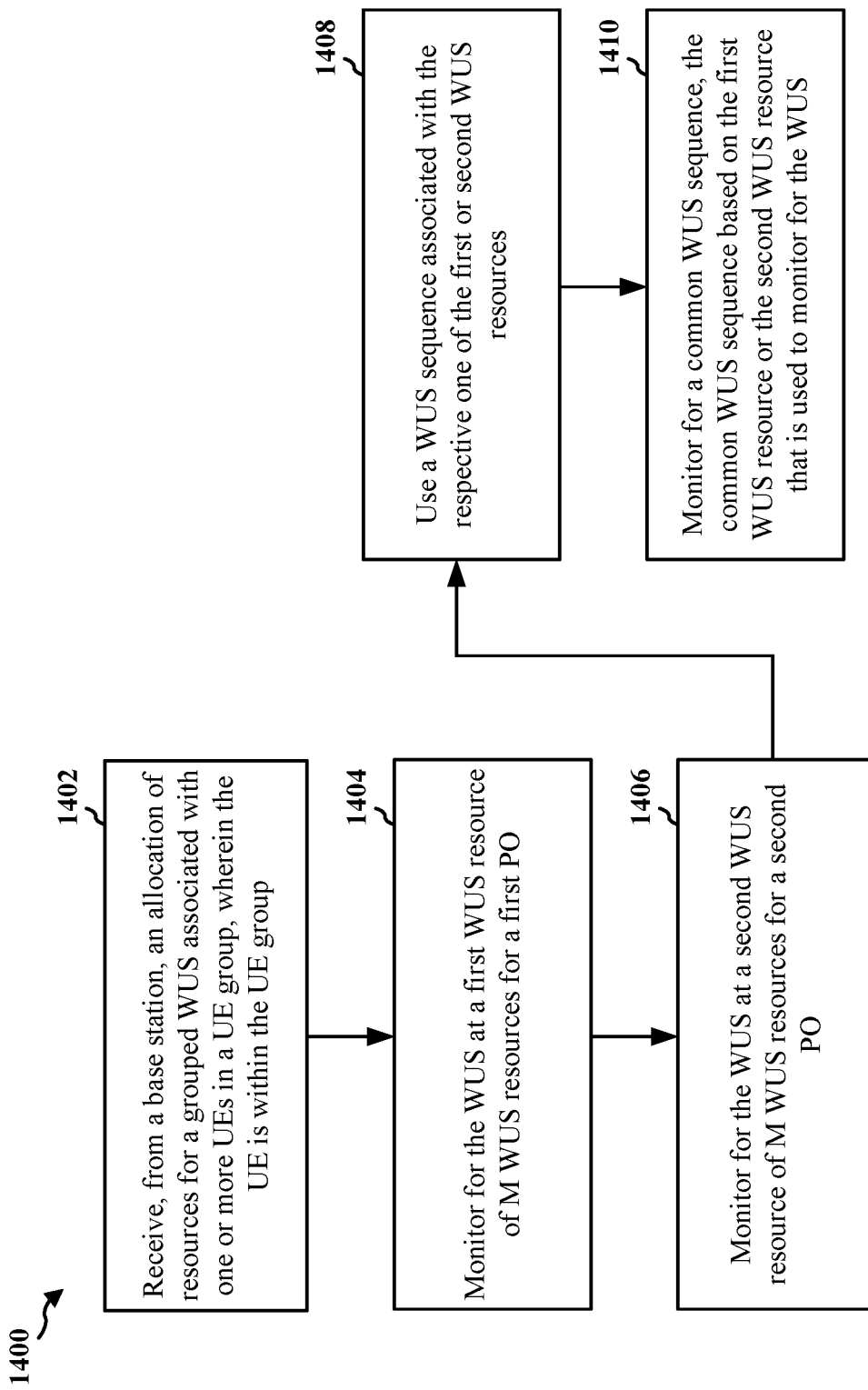
FIG. 14 is a flowchart of a method of wireless communication.

FIG. 14 is a flowchart of a method 1400 of wireless communication. The method may be performed by a UE or a component of a UE (e.g., the UE 104, 350, 702, 802, 902, which may include the memory 360 and which may be the entire UE 350 or a component of the UE 350, such as the TX processor 368, the RX processor 356, and/or the controller/processor 359). According to various aspects, one or more of the illustrated operations of the method 1400 may be omitted, transposed, and/or contemporaneously performed. The method may enable a UE to monitor for a WUS at a WUS resource.

At 1402, the UE may receive an allocation of resources for a group WUS associated with one or more UEs in a UE group, where the UE may be within the UE group. The UE may receive the allocation of resources for the group WUS from the base station.

At 1404, the UE may monitor for the WUS at a first WUS resource of M WUS resources for a first paging opportunity.

At 1406, the UE may monitor for the WUS at a second WUS resource of M WUS resources for a second paging opportunity. In some aspects, the UE may monitor for the WUS at different POs using a pattern associated with a location of the M WUS resources. The pattern associated with the M WUS resources may be determined at least based on a discontinuous reception cycle indicated in system information. In some aspects, a same WUS sequence may be allocated for the UE group to monitor any of the M WUS resources.

In some aspects, for example at 1408, the UE may use a WUS sequence associated with the respective one of the first WUS resource or the second WUS resource. The WUS sequence may further include a scrambling sequence associated with the respective one of the first WUS resource or the second WUS resource. The scrambling sequence may be based on the first WUS resource or the second WUS resource that is used for the WUS. The WUS sequence may further include a phase shift. The phase shift may be based on the UE group. In some aspects, the phase shift may be the same if the first WUS resource or the second WUS resource is used for the WUS.

In some aspects, for example, at 1410, the UE may monitor for a common WUS sequence. The common WUS sequence may be based on the first WUS resource or the second WUS resource that is used to monitor for the WUS.

In some aspects, the one or more UEs in the UE group may be configured to alternate between the first WUS resource and M−1 WUS resources. The one or more UEs in the UE group may alternate between the first WUS resource and M−1 WUS resources if the first WUS resource is allocated for the group WUS. In some aspects, the one or more UEs in the UE group may be configured to alternate between the second WUS resource and M WUS resources when the first WUS resource is not allocated for the group WUS. In yet some aspects, the one or more UEs in the UE group may be configured to determine whether to alternate between WUS resources based on an amount of the M WUS resources.

Figure 15:
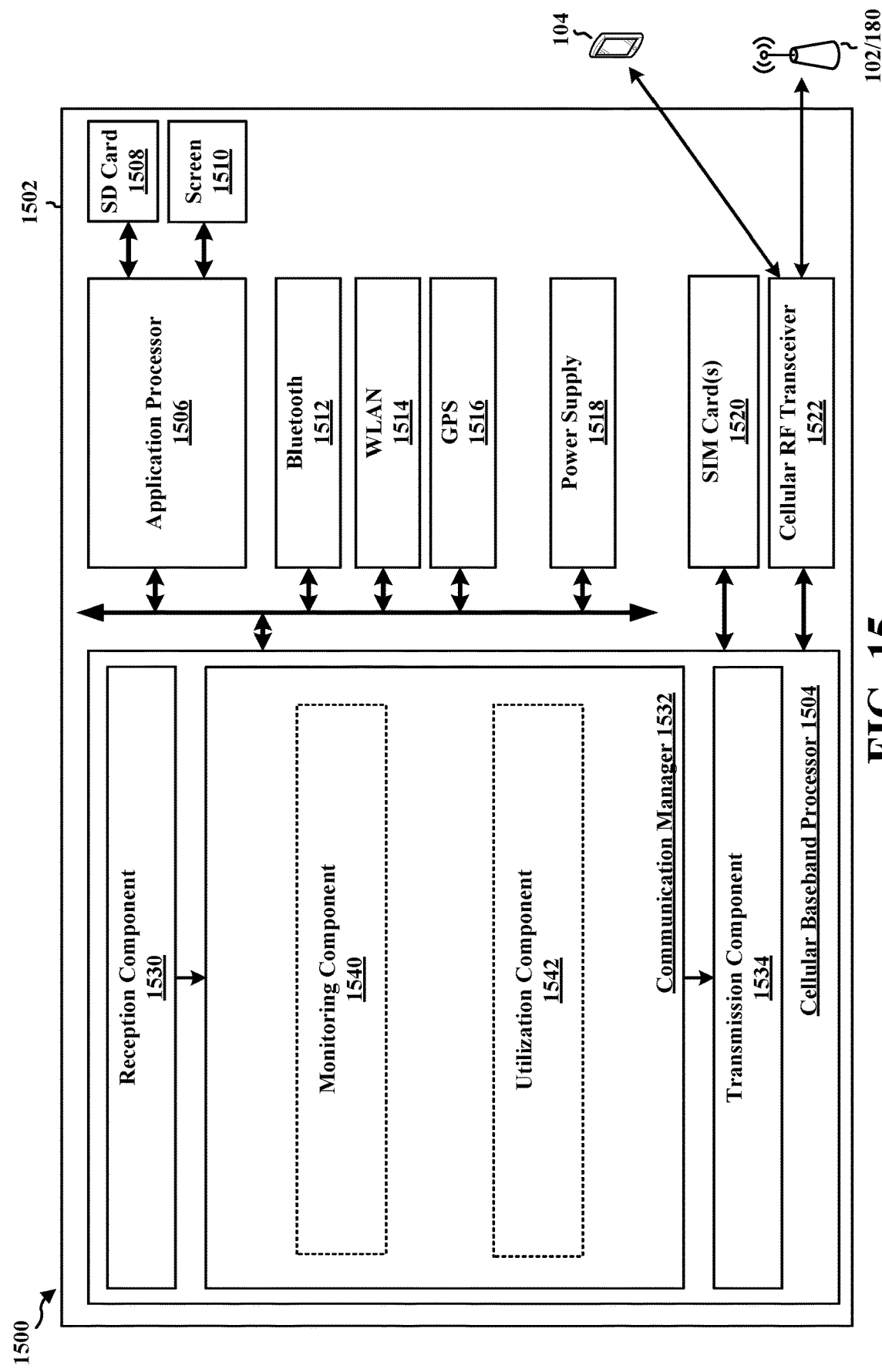
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforementioned additional modules of the apparatus 1502.

The reception component 1530 is configured to receive, from a base station (e.g., 102/180), an allocation of resources for a group WUS associated with one or more UEs in a UE group, e.g., as described in connection with block 1402 of the method 1400 of FIG. 14. The communication manager 1532 includes a monitoring component 1542 that receives input in the form of the allocation of resources from the reception component 1530 and is configured to monitor for the group WUS at a first WUS resource of M WUS resources for a first PO, e.g., as described in connection with block 1404 of the method 1400 of FIG. 14. The monitoring component 1542 is further configured to monitor for the group WUS at a second WUS resource of M WUS resources for a second PO, e.g., as described in connection with block 1406 of the method 1400 of FIG. 14. The communication manager 1532 further includes a utilization component 1542 that is configured to use a WUS sequence associated with the respective one of the first or second WUS resources, e.g., as described in connection with block 1408 of the method 1400 of FIG. 14. The monitoring component 1542 is further configured to monitor for a common WUS sequence, in which the common WUS sequence based on the first WUS resource or the second WUS resource that is used to monitor for the WUS, e.g., as described in connection with block 1410 of the method 1400 of FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving, from a base station, an allocation of resources for a group WUS associated with one or more UEs in a UE group, in which the UE is within the UE group; means for monitoring for the group WUS at a first WUS resource of M WUS resources for a first PO; means for monitoring for the group WUS at a second WUS resource of M WUS resources for a second PO; means for using a WUS sequence associated with the respective one of the first or second WUS resources; and means for monitoring for a common WUS sequence, in which the common WUS sequence based on the first WUS resource or the second WUS resource that is used to monitor for the WUS. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
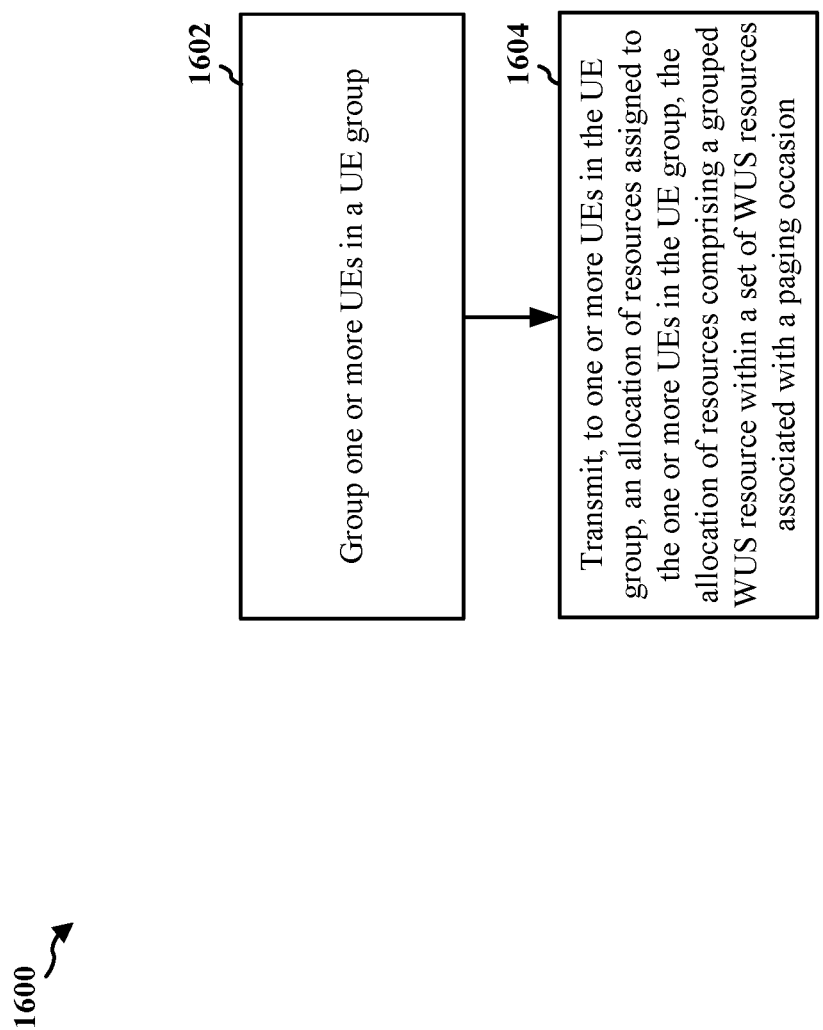
FIG. 16 is a flowchart of a method of wireless communication.

FIG. 16 is a flowchart of a method 1600 of wireless communication. The method may be performed by a base station or a component of a base station (e.g., the base station 102, 108, 310, 704, 804, 904, which may include the memory 376 and which may be the entire base station 310 or a component of the base station 310, such as the TX processor 316, the RX processor 370, and/or the controller/processor 375). According to various aspects, one or more of the illustrated operations of the method 1600 may be omitted, transposed, and/or contemporaneously performed. The method may enable a base station to transmit a WUS.

At 1602, the base station may group one or more UEs in a UE group.

At 1604, the base station may transmit an allocation of resources to one or more UEs in the UE group. The allocation of resources may be assigned to the one or more UEs in the UE group. The allocation of resources may comprise a group WUS resource within a set of WUS resources associated with a paging occasion. In some aspects, the set of WUS resources may include an ungrouped WUS. A location of the group WUS may be based on a frequency location of the ungrouped WUS. In some aspects, the location of the group WUS resource may be based on the ungrouped WUS having a frequency location in a first resource block and a second resource block of a six resource block bandwidth, e.g., as shown in Pattern 1 of FIG. 4 or Patterns 4 and 6 of FIG. 5. In some aspects, the location of the group WUS resource may be based on the ungrouped WUS having the frequency location in a third resource block and a fourth resource block of the six resource block bandwidth, e.g., as shown in Patterns 2-1 and 2-2 of FIG. 4 or Patterns 8 and 9 of FIG. 5. In some aspects, the location of the group WUS resource may be based on the ungrouped WUS having the frequency location in a fifth resource block and a sixth resource block of the six resource block bandwidth, e.g., as shown in Pattern 3 of FIG. 4 or Patterns 5 and 7 of FIG. 5. In some aspects, the location of the group WUS resource may be based on at least one of the ungrouped WUS having the frequency location in a first resource block and a second resource block of a six resource block bandwidth, the ungrouped WUS having the frequency location in a third resource block and a fourth resource block of the six resource block bandwidth, or the ungrouped WUS having the frequency location in a fifth resource block and a sixth resource block of the six resource block bandwidth. In some aspects, the set of WUS resources may not include an ungrouped WUS. In such instances, the location of the group WUS resource may be based on information indicated in a configuration for the group WUS. The set of WUS resources may be consecutive in time and frequency. In some aspects, the set of WUS resources may be non-consecutive in time or frequency.

Figure 17:
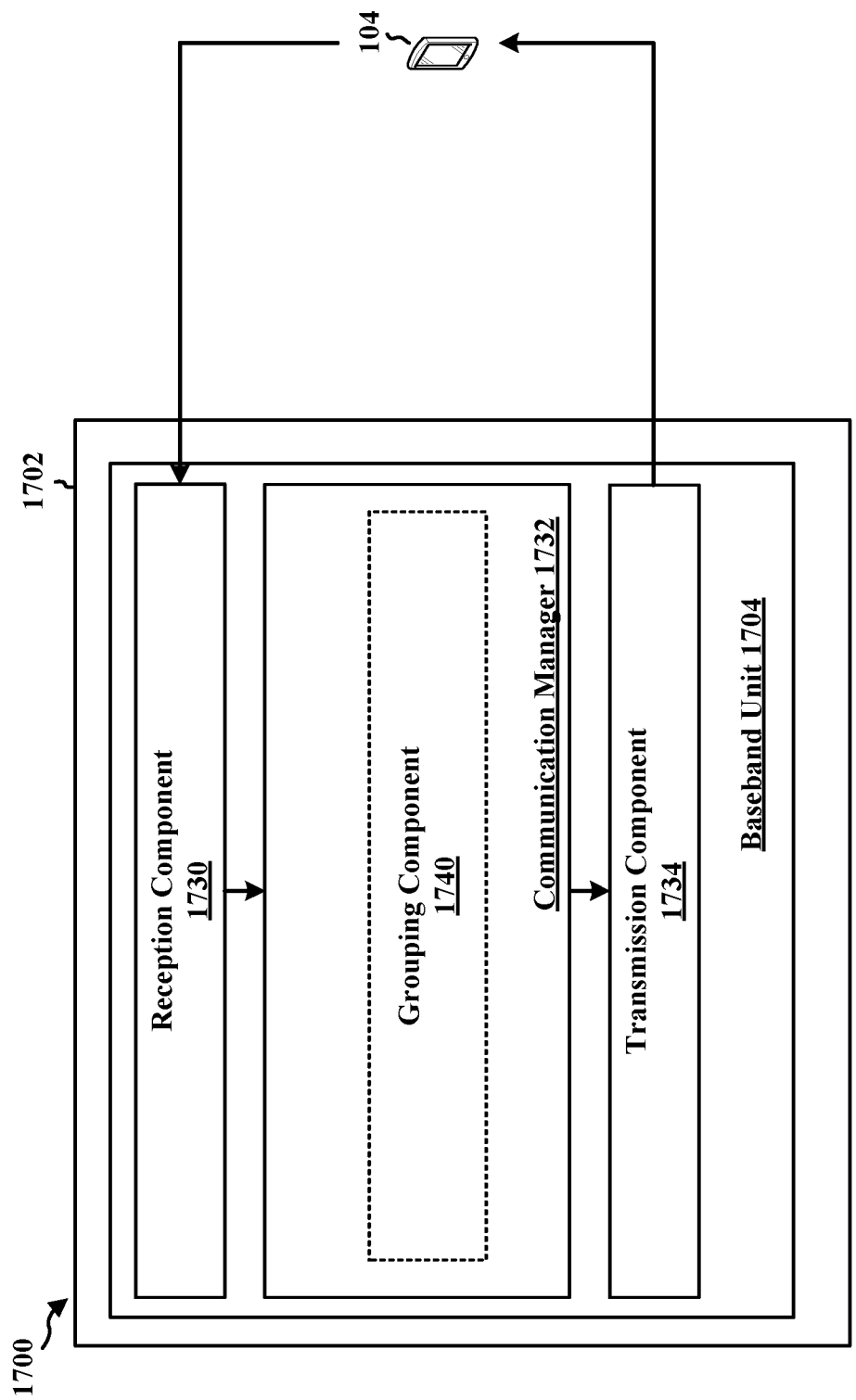
FIG. 17 is a diagram illustrating an example of a hardware implementation for an example apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the BS 310 and may include the memory 376 and/or at least one of the TX processor 316, the RX processor 370, and the controller/processor 375.

The communication manager 1732 includes a grouping component 1740 that is configured to group one or more UEs in a UE group, e.g., as described in connection with block 1602 of the method 1600 of FIG. 16. The transmission component 1534 is configured to transmit to one or more UEs in the UE group, an allocation of resources assigned to the one or more UEs in the UE group, e.g., as described in connection with block 1604 of the method 1600 of FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for grouping one or more UEs in a UE group; and means for transmitting, to one or more UEs in the UE group, an allocation of resources assigned to the one or more UEs in the UE group, in which the allocation of resources includes a group WUS resource within a set of WUS resources associated with a paging occasion. The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 18:
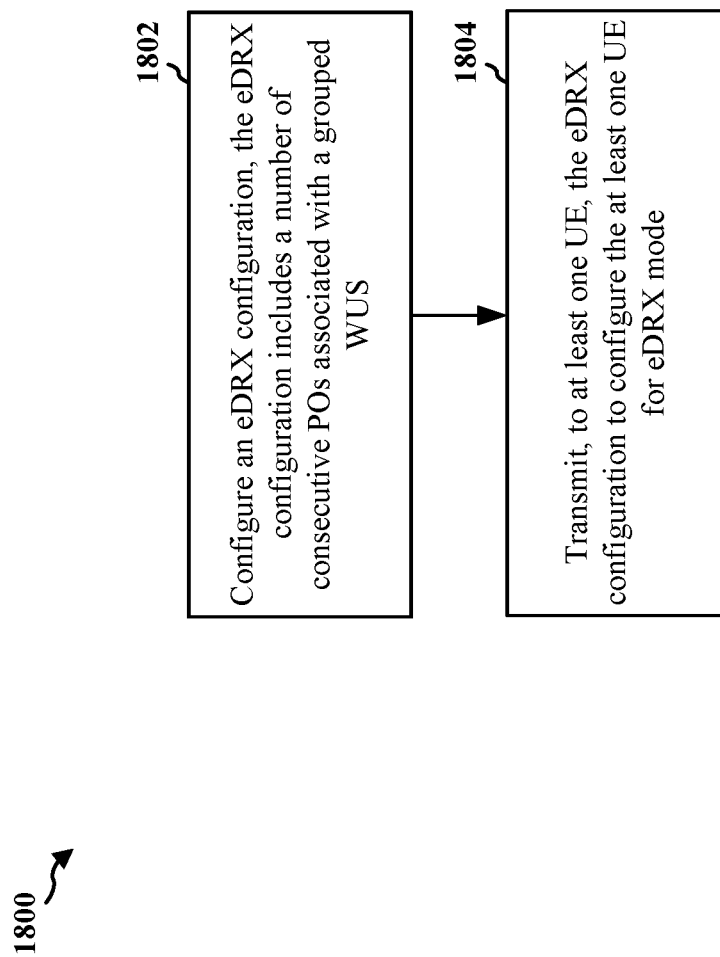
FIG. 18 is a flowchart of a method of wireless communication.

FIG. 18 is a flowchart of a method 1800 of wireless communication. The method may be performed by a base station or a component of a base station (e.g., the base station 102, 108, 310, 704, 804, 904, which may include the memory 376 and which may be the entire base station 310 or a component of the base station 310, such as the TX processor 316, the RX processor 370, and/or the controller/processor 375). According to various aspects, one or more of the illustrated operations of the method 1800 may be omitted, transposed, and/or contemporaneously performed. The method may enable a base station to transmitting an eDRX configuration to a UE.

At 1802, the base station may configure an eDRX configuration. The eDRX configuration may include a number of consecutive POs associated with a group WUS. In some aspects, the eDRX configuration may include a configured number of consecutive POs associated with an ungrouped WUS. The number of consecutive POs associated with the group WUS may be based on the configured number of consecutive POs associated with the ungrouped WUS. In some aspects, the eDRX configuration may indicate the number of consecutive POs associated for the group WUS.

At 1804, the base station may transmit the eDRX configuration to at least one UE. The eDRX configuration may configure the at least one UE for eDRX mode.

Figure 19:
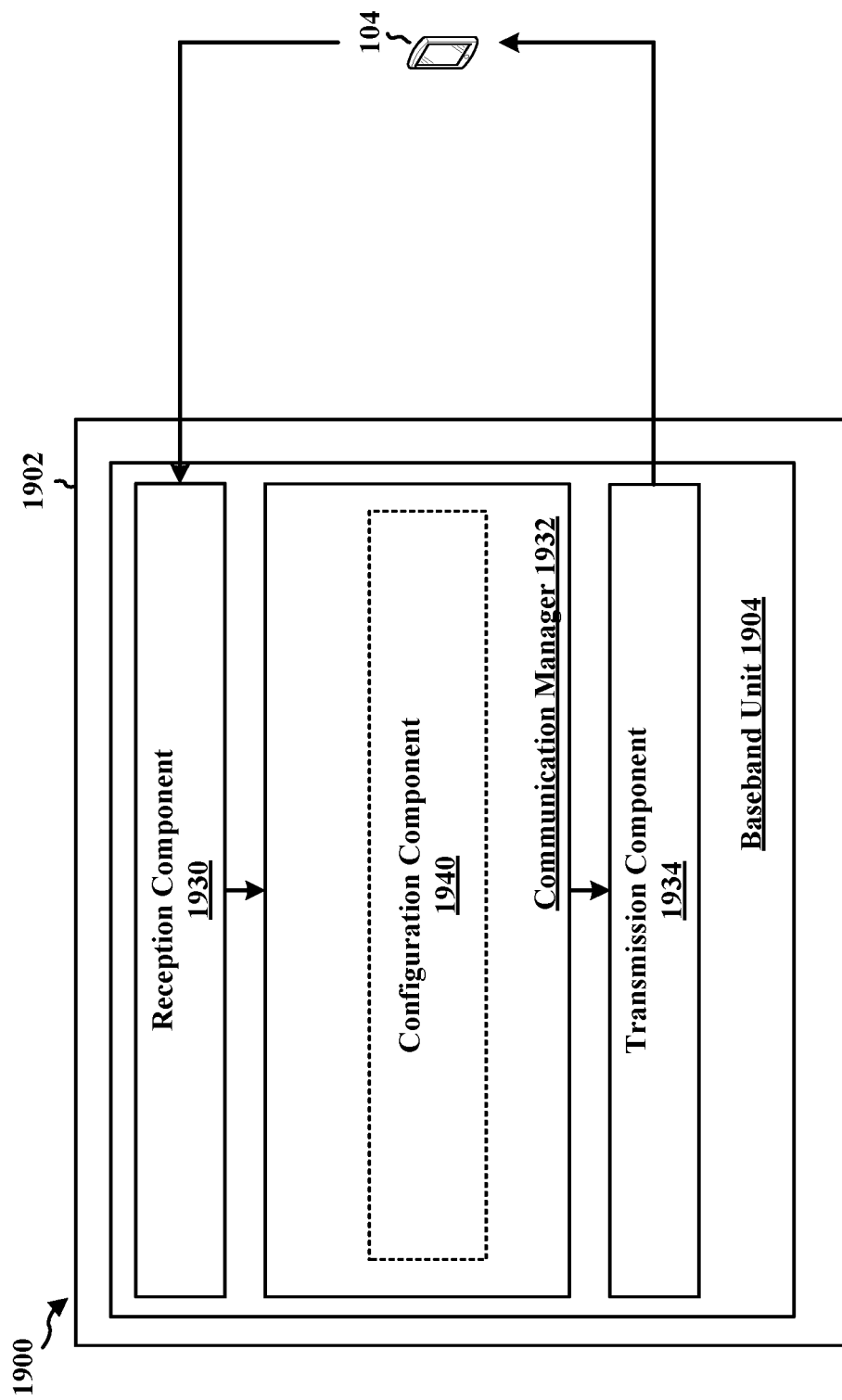
FIG. 19 is a diagram illustrating an example of a hardware implementation for an example apparatus.

FIG. 19 is a diagram 1900 illustrating an example of a hardware implementation for an apparatus 1902. The apparatus 1902 is a BS and includes a baseband unit 1904. The baseband unit 1904 may communicate through a cellular RF transceiver with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the BS 310 and may include the memory 376 and/or at least one of the TX processor 316, the RX processor 370, and the controller/processor 375.

The communication manager 1932 includes a configuration component 1940 that is configured to configure an eDRX configuration, in which the eDRX configuration includes a number of consecutive POs associated with a group WUS, e.g., as described in connection with block 1802 of the method 1800 of FIG. 18. The transmission component 1534 is configured to transmit the eDRX configuration to at least one UE, e.g., as described in connection with block 1804 of the method 1800 of FIG. 18.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for configuring an eDRX configuration; and means for transmitting, to at least one UE, the eDRX configuration to configure the at least one UE for eDRX mode. The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
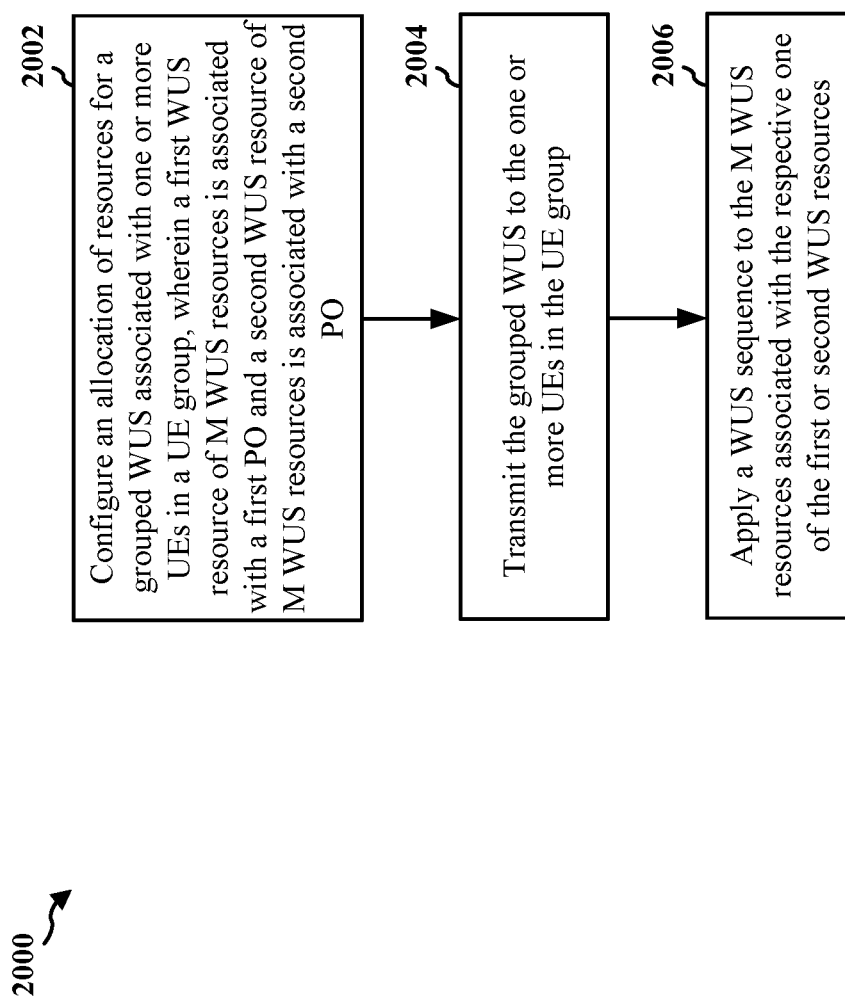
FIG. 20 is a flowchart of a method of wireless communication.

FIG. 20 is a flowchart of a method 2000 of wireless communication. The method may be performed by a base station or a component of a base station (e.g., the base station 102, 108, 310, 704, 804, 904, which may include the memory 376 and which may be the entire base station 310 or a component of the base station 310, such as the TX processor 316, the RX processor 370, and/or the controller/processor 375). According to various aspects, one or more of the illustrated operations of the method 2000 may be omitted, transposed, and/or contemporaneously performed. The method may enable a base station to transmit a group WUS to one or more UEs in a UE group.

At 2002, the base station may configure an allocation of resources for a group WUS associated with one or more UEs in a UE group. A first WUS resource of M WUS resources may be associated with a first PO. A second WUS resource of M WUS resources may be associated with a second PO. In some aspects, a same WUS sequence may be allocated for the UE group to monitor any of the M WUS resources.

At 2004, the base station may transmit the group WUS to the one or more UEs in the UE group. In some aspects, the base station may transmit the group WUS associated with the one or more UEs at different POs using a pattern associated with a location of the M WUS resources.

In some aspects, for example at 2006, the base station may apply a WUS sequence to the M WUS resources associated with the respective one of the first or second WUS resources. The WUS sequence may further include a scrambling sequence associated with the respective one of the first or second WUS resources.

Figure 21:
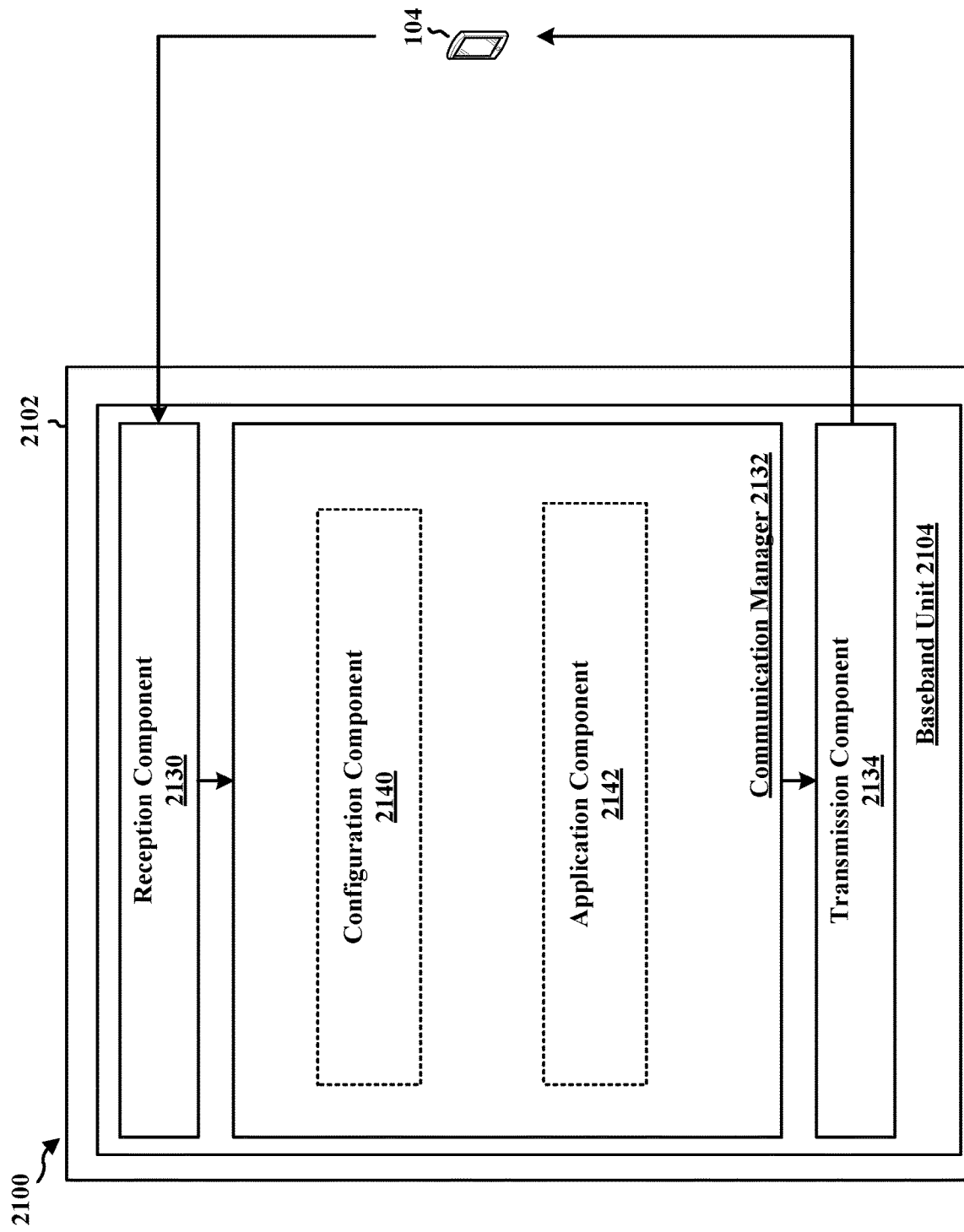
FIG. 21 is a diagram illustrating an example of a hardware implementation for an example apparatus.

FIG. 21 is a diagram 2100 illustrating an example of a hardware implementation for an apparatus 2102. The apparatus 2102 is a BS and includes a baseband unit 2104. The baseband unit 2104 may communicate through a cellular RF transceiver with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the BS 310 and may include the memory 376 and/or at least one of the TX processor 316, the RX processor 370, and the controller/processor 375.

The communication manager 2132 includes a configuration component 2140 that is configured to configure an allocation of resources for a group WUS associated with one or more UEs in a UE group, e.g., as described in connection with block 2002 of the method 2000 of FIG. 20. The transmission component 2134 is configured to transmit the group WUS to the one or more UEs in the UE group, e.g., as described in connection with block 2004 of the method 2000 of FIG. 20. The communication manager 2132 further includes an application component 2142 that is configured to apply a WUS sequence to the M WUS resources associated with the respective one of the first or second WUS resources, e.g., as described in connection with block 2006 of the method 2000 of FIG. 20.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the baseband unit 2104, includes means for configuring an allocation of resources for a group WUS associated with one or more UEs in a UE group; means for transmitting the group WUS to the one or more UEs in the UE group; and means for applying a WUS sequence to the M WUS resources associated with the respective one of the first or second WUS resources. The aforementioned means may be one or more of the aforementioned components of the apparatus 2102 configured to perform the functions recited by the aforementioned means. As described supra, the apparatus 2102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving, from a base station, a resource allocation for a group wake-up signal (WUS) associated with one or more UEs in a UE group, wherein the UE is within the UE group;
    monitoring for the group WUS at a first WUS resource of M WUS resources associated with a first paging opportunity (PO); and
    monitoring for the group WUS at a second WUS resource of M WUS resources associated with a second PO;
    receiving a WUS sequence associated with a respective one of the first WUS resource or the second WUS resource, wherein the WUS sequence includes a scrambling sequence associated with the respective one of the first WUS resource or the second WUS resource and the WUS sequence has a phase shift that is based on the UE group.

2. The method of claim 1, wherein the one or more UEs in the UE group belong to a same service type.

3. The method of claim 1, wherein the monitoring comprises monitoring for the group WUS at different system frame numbers (SFNs) or POs using a WUS group alternation pattern associated with the M WUS resources.

4. The method of claim 3, wherein the pattern associated with the M WUS resources is indicative of the first WUS resource and the second WUS resource for which each of the one or more UEs in the UE group are configured to monitor.

5. The method of claim 3, wherein the pattern associated with the M WUS resources includes alternating UE groups of a minimum number of UE groups for each WUS resource of the M WUS resources.

6. The method of claim 3, wherein the pattern associated with the M WUS resources is configured based on whether the first WUS resource is allocated for the group WUS and the first WUS resource includes a common WUS resources that corresponds to an ungrouped WUS sequence.

7. The method of claim 3, wherein the pattern associated with the M WUS resources is configured based on whether the UE group is based on a paging probability of different service types.

8. The method of claim 3, wherein the pattern associated with the M WUS resources is determined at least based on a discontinuous reception (DRX) cycle indicated in system information or is predefined.

9. The method of claim 8, wherein the DRX cycle is a cell-specific DRX cycle.

10. The method of claim 8, wherein the DRX cycle is configured based on values of UE-specific DRX cycle.

11. The method of claim 1, wherein the phase shift is the same if the first WUS resource or the second WUS resource is used for the group WUS.

12. The method of claim 1, further comprising:
    monitoring for a common WUS sequence that is based on the first WUS resource or the second WUS resource.

13. An apparatus for wireless communication at a user equipment (UE), the apparatus comprising:
    means for receiving, from a base station, a resource allocation for a group wake-up signal (WUS) associated with one or more UEs in a UE group, wherein the UE is within the UE group;
    means for monitoring for the group WUS at a first WUS resource of M WUS resources associated with a first paging opportunity (PO); and
    means for monitoring for the group WUS at a second WUS resource of M WUS resources associated with a second PO;
    receiving a WUS sequence associated with a respective one of the first WUS resource or the second WUS resource, wherein the WUS sequence includes a scrambling sequence associated with the respective one of the first WUS resource or the second WUS resource and the WUS sequence has a phase shift that is based on the UE group.

14. The apparatus of claim 13, wherein the one or more UEs in the UE group belong to a same service type.

15. The apparatus of claim 13, wherein the means for monitoring is further configured to monitor for the group WUS at different system frame numbers (SFNs) or POs using a WUS group alternation pattern associated with the M WUS resources.

16. The apparatus of claim 13, further comprising:
    means for receiving a WUS sequence associated with a respective one of the first WUS resource or the second WUS resource.

17. An apparatus for wireless communication at a user equipment (UE), the apparatus comprising:
    a transceiver;
    at least one processor; and
    a memory, coupled to the transceiver and the at least one processor, storing instructions thereon, which when executed by the at least one processor, cause the apparatus to:

receive, from a base station, via the transceiver, a resource allocation for a group wake-up signal (WUS) associated with one or more UEs in a UE group, wherein the UE is within the UE group;

monitor for the group WUS at a first WUS resource of M WUS resources associated with a first paging opportunity (PO); and monitor for the group WUS at a second WUS resource of M WUS resources associated with a second PO;

receiving a WUS sequence associated with a respective one of the first WUS resource or the second WUS resource, wherein the WUS sequence includes a scrambling sequence associated with the respective one of the first WUS resource or the second WUS resource and the WUS sequence has a phase shift that is based on the UE group.

18. The apparatus of claim 17, wherein the one or more UEs in the UE group belong to a same service type.

19. The apparatus of claim 17, wherein the instructions, which when executed by the at least one processor, further causes the apparatus to monitor for the group WUS at different system frame numbers (SFNs) or POs using a WUS group alternation pattern associated with the M WUS resources.

20. A non-transitory computer-readable medium storing computer executable code for wireless communication at a user equipment (UE), the code, which when executed by at least one processor, causes the UE to:

receive, from a base station, a resource allocation for a group wake-up signal (WUS) associated with one or more UEs in a UE group, wherein the UE is within the UE group;

monitor for the group WUS at a first WUS resource of M WUS resources associated with a first paging opportunity (PO); and monitor for the group WUS at a second WUS resource of M WUS resources associated with a second PO;

receiving a WUS sequence associated with a respective one of the first WUS resource or the second WUS resource, wherein the WUS sequence includes a scrambling sequence associated with the respective one of the first WUS resource or the second WUS resource and the WUS sequence has a phase shift that is based on the UE group.

21. The non-transitory computer-readable medium of claim 20, wherein the code, which when executed by at least one processor, further causes the UE to:

receive a WUS sequence associated with a respective one of the first WUS resource or the second WUS resource.

22. A method of wireless communication at a user equipment (UE), comprising:

receiving, from a base station, a resource allocation for a group wake-up signal (WUS) associated with one or more UEs in a UE group, wherein the UE is within the UE group;

monitoring for the group WUS at a first WUS resource of M WUS resources associated with a first paging opportunity (PO); and monitoring for the group WUS at a second WUS resource of M WUS resources associated with a second PO;

receiving a WUS sequence associated with a respective one of the first WUS resource or the second WUS resource wherein the WUS sequence includes a scrambling sequence associated with the respective one of the first WUS resource or the second WUS resource and the scrambling sequence different for different WUS resources based on different initialization seeds.

23. A method of wireless communication at a user equipment (UE), comprising:

receiving, from a base station, a resource allocation for a group wake-up signal (WUS) associated with one or more UEs in a UE group, wherein the UE is within the UE group;

monitoring for the group WUS at a first WUS resource of M WUS resources associated with a first paging opportunity (PO); and monitoring for the group WUS at a second WUS resource of M WUS resources associated with a second PO, wherein the monitoring comprises monitoring for the group WUS using a scrambling sequence differs as between the first WUS resource and the second WUS resource.

24. A method of wireless communication at a user equipment (UE), comprising:

receiving, from a base station, a resource allocation for a group wake-up signal (WUS) associated with one or more UEs in a UE group, wherein the UE is within the UE group;

monitoring for the group WUS at a first WUS resource of M WUS resources associated with a first paging opportunity (PO); and monitoring for the group WUS at a second WUS resource of M WUS resources associated with a second PO;

wherein the one or more UEs in the UE group are configured to one of:

alternate between the first WUS resource and M−1 WUS resources if the first WUS resource is allocated for the group WUS, alternate between the second WUS resource and M WUS resources if the first WUS resource is not allocated for the group WUS, or alternate between WUS resources based on an amount of the M WUS resources.

25. An apparatus for wireless communication at a user equipment (UE), the apparatus comprising:

a transceiver;

at least one processor; and a memory, coupled to the transceiver and the at least one processor, storing instructions thereon, which when executed by the at least one processor, cause the apparatus to:

receive, from a base station, via the transceiver, a resource allocation for a group wake-up signal (WUS) associated with one or more UEs in a UE group, wherein the UE is within the UE group;

monitor for the group WUS at a first WUS resource of M WUS resources associated with a first paging opportunity (PO); and monitor for the group WUS at a second WUS resource of M WUS resources associated with a second PO;

receiving a WUS sequence associated with a respective one of the first WUS resource or the second WUS resource wherein the WUS sequence includes a scrambling sequence associated with the respective one of the first WUS resource or the second WUS resource and the scrambling sequence differs for different WUS resources based on different initialization seeds.

26. An apparatus for wireless communication at a user equipment (UE), the apparatus comprising:

a transceiver;

at least one processor; and a memory, coupled to the transceiver and the at least one processor, storing instructions thereon, which when executed by the at least one processor, cause the apparatus to:

receive, from a base station, via the transceiver, a resource allocation for a group wake-up signal (WUS) associated with one or more UEs in a UE group, wherein the UE is within the UE group;

monitor for the group WUS at a first WUS resource of M WUS resources associated with a first paging opportunity (PO); and monitor for the group WUS at a second WUS resource of M WUS resources associated with a second PO;

wherein the monitoring comprises monitoring for the group WUS using a scrambling sequence that differ as between the first WUS resource and the second WUS resource.

27. An apparatus for wireless communication at a user equipment (UE), the apparatus comprising:

a transceiver;

at least one processor; and a memory, coupled to the transceiver and the at least one processor, storing instructions thereon, which when executed by the at least one processor, cause the apparatus to:

receive, from a base station, via the transceiver, a resource allocation for a group wake-up signal (WUS) associated with one or more UEs in a UE group, wherein the UE is within the UE group;

monitor for the group WUS at a first WUS resource of M WUS resources associated with a first paging opportunity (PO); and monitor for the group WUS at a second WUS resource of M WUS resources associated with a second PO;

wherein the one or more UEs in the UE group are configured to one of:

alternate between the first WUS resource and M−1 WUS resources if the first WUS resource is allocated for the group WUS, alternate between the second WUS resource and M WUS resources if the first WUS resource is not allocated for the group WUS, or alternate between WUS resources based on an amount of the M WUS resources.

* * * * *